(12) United States Patent
Kojoh et al.

(10) Patent No.: US 6,323,150 B1
(45) Date of Patent: Nov. 27, 2001

(54) PROCESS FOR PREPARING SOLID TITANIUM CATALYST COMPONENT, OLEFIN POLYMERIZATION CATALYST, AND OLEFIN POLYMERIZATION PROCESS

(75) Inventors: Shinichi Kojoh; Tsuneo Yashiki; Kazumitsu Kawakita; Masao Nakano; Sadahiko Matsuura, all of Kuga-gun (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/131,837

(22) Filed: Aug. 10, 1998

(30) Foreign Application Priority Data

Aug. 11, 1997 (JP) .................................................. 9-216703

(51) Int. Cl.[7] .................................................. B01J 31/00
(52) U.S. Cl. ........................ 502/125; 103/104; 103/118; 103/126; 103/127
(58) Field of Search ..................................... 502/103, 104, 502/118, 125, 126, 127

(56) References Cited

U.S. PATENT DOCUMENTS

| | | | |
|---|---|---|---|
| 4,784,983 | * 11/1988 | Mao et al. ........................... | 502/111 |
| 4,980,329 | * 12/1990 | Barbe et al. ........................ | 502/111 |
| 5,328,877 | * 7/1994 | Chadwick et al. .................. | 502/127 |
| 5,547,912 | * 8/1996 | Kataoka et al. ..................... | 502/154 |

FOREIGN PATENT DOCUMENTS

| | | | |
|---|---|---|---|
| 0657477A | 6/1995 | (EP) | ............................... C08F/10/06 |
| 0712869A | 5/1996 | (EP) | ............................... C08F/10/06 |
| 0683175A2 | 11/1995 | (EP) | ............................... C08F/4/654 |
| 08034813A | 2/1996 | (JP) | ............................... C08F/4/654 |
| WO9812234A | 3/1998 | (WO) | ............................... C08F/4/654 |

\* cited by examiner

Primary Examiner—Elizabeth D. Wood
(74) Attorney, Agent, or Firm—Birch, Stewart, Kolasch & Birch, LLP

(57) ABSTRACT

Disclosed is a process for preparing a solid titanium catalyst component, comprising the steps of (I) contacting a liquid magnesium compound with a liquid titanium compound to precipitate a solid in the contact liquid (β), and adding an electron donor (d-i) selected from the group consisting of a polycarboxylic ester and a polyether compound to the contact liquid (β) during the time from beginning to end of the solid precipitation, to form a solid product (α); and (II) contacting the solid product (α) obtained after completion of the solid precipitation with an electron donor (d-ii) selected from the group consisting of a polycarboxylic ester and a polyether compound, to prepare a solid titanium catalyst component. According to the process, a solid titanium catalyst component capable of polymerizing an olefin with high activity and capable of preparing an olefin polymer of high stereoregularity can be prepared. Also disclosed are an olefin polymerization catalyst containing a solid titanium catalyst component obtained by the above process and an olefin polymerization process using the olefin polymerization catalyst.

36 Claims, 1 Drawing Sheet

PROCESS FOR PREPARING SOLID TITANIUM CATALYST COMPONENT, OLEFIN POLYMERIZATION CATALYST, AND OLEFIN POLYMERIZATION PROCESS

FIELD OF THE INVENTION

The present invention relates to a process for preparing a solid titanium catalyst component that is capable of polymerizing an olefin with high activity and capable of preparing an olefin polymer of high stereoregularity. The present invention also relates to an olefin polymerization catalyst containing the solid titanium catalyst component and to an olefin polymerization process.

BACKGROUND OF THE INVENTION

Catalysts formed from titanium catalyst components and organoaluminum compounds have been hitherto widely used as those for preparing polyolefins, and the catalysts using supported solid titanium catalyst components as the titanium catalyst components are known to exhibit high polymerization activity.

It is known that a catalyst comprising a solid titanium catalyst component containing titanium, magnesium, halogen and an electron donor (inside donor) and an organoaluminum compound exhibits particularly high polymerization activity and that a polyolefin of high stereoregularity can be prepared when an α-olefin of 3 or more carbon atoms is polymerized in the presence of the catalyst.

It is also known that a solid titanium catalyst component particularly containing a polycarboxylic ester or a compound having two or more ether linkages present through plural atoms (polyether compound), which is selected from among various compounds proposed as the electron donors (inside donors), exhibits high activity.

The present applicant has proposed so far many solid titanium catalyst components comprising titanium, magnesium, halogen and a polycarboxylic ester or a polyether compound as the electron donor.

Specifically, the present applicant has proposed that a solid titanium catalyst component of particularly high activity can be obtained by contacting a liquid magnesium compound with a liquid titanium compound and a polycarboxylic ester or a polyether compound.

For example, Japanese Patent Laid-Open Publication No, 34813/1996 describes, in the example, a process for preparing a solid titanium catalyst component comprising contacting a liquid magnesium compound with a liquid titanium compound and a polycarboxylic ester as the electron donor, wherein the liquid magnesium compound is contacted with the liquid titanium compound to precipitate a solid titanium catalyst component and the solid titanium catalyst component is then contacted with the polycarboxylic ester.

The present inventors have further studied the solid titanium catalyst components and the olefin polymerization catalysts, and as a result they have found that a solid titanium catalyst component capable of preparing a polyolefin of higher stereoregularity with higher activity can be obtained by a process comprising contacting a liquid magnesium compound with a liquid titanium compound and a polycarboxylic ester and/or a polyether compound as the electron donor, wherein the electron donor is added during the time from the beginning of solid precipitation caused by the contact of the liquid magnesium compound with the liquid titanium compound to the end of the solid precipitation, and the resulting solid product is then contacted with the electron donor again. Based on the above finding, the present invention has been accomplished.

OBJECT OF THE INVENTION

It is an object of the present invention to provide a process for preparing such a solid titanium catalyst component as is capable of polymerizing an olefin with high activity and capable of preparing an olefin polymer of high stereoregularity, and to provide an olefin polymerization catalyst containing the solid titanium catalyst component and an olefin polymerization process.

SUMMARY OF THE INVENTION

The process for preparing a solid titanium catalyst component according to the invention is a process comprising the steps of:

(I) contacting a liquid magnesium compound with a liquid titanium compound to precipitate a solid in the contact liquid (β), and adding an electron donor (d-i), which is selected from the group consisting of a polycarboxylic ester and a compound having two or more ether linkages present through plural atoms, to the contact liquid (β) during the time from beginning to end of the solid precipitation, to form a solid product (α) comprising titanium, magnesium, halogen and the electron donor (d-i); and then (II) contacting the solid product (α) obtained after completion of the solid precipitation with an electron donor (d-ii) selected from the group consisting of a polycarboxylic ester and a compound having two or more ether linkages present through plural atoms, to prepare a solid titanium catalyst component comprising titanium, magnesium, halogen, the electron donor (d-i) and the electron donor (d-ii).

The contact liquid (β) generally contains, before addition of the electron donor (d-i) thereto, an electron donor (d-iii) selected from the group consisting of a monocarboxylic ester, an aliphatic carboxylic acid, an acid anhydride, a ketone, a monoether, an aliphatic carbonate, an alkoxy group-containing alcohol, an aryloxy group-containing alcohol, an organosilicon compound having Si—O—C bond and an organophosphorus compound having P—O—C bond.

The polycarboxylic ester as the electron donor (d-i) or the electron donor (d-ii) is preferably a phthalic diester represented by the following formula:

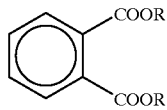

wherein R is a branched hydrocarbon group of 3 to 12 carbon atoms, and two of R may be the same or different.

When each of the electron donor (d-i) and the electron donor (d-ii) is a polycarboxylic ester, it is preferable that the electron donor (d-i) used in the step (I) is diheptyl phthalate and the electron donor (d-ii) used in the step (II) is diisobutyl phthalate.

The compound having two or more ether linkages present through plural atoms is preferably represented by the following formula:

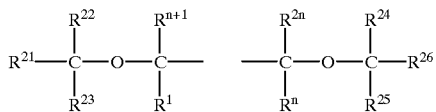

wherein n is an integer of $2 \leq n \leq 10$, $R^1$ to $R^{26}$ are each a substituent having at least one element selected from carbon, hydrogen, oxygen, halogen, nitrogen, sulfur, phosphorus, boron and silicon; groups optionally selected from $R^1$ to $R^{26}$, preferably from $R^1$ to $R^{2n}$, may form in cooperation a ring other than a benzene ring; and the main chain may contain an atom other than carbon.

In the present invention, the molar ratio of the electron donor (d-i) used in the step (I) to the electron donor (d-ii) used in the step (II) is preferably in the range of 10/90 to 90/10.

The olefin polymerization catalyst according to the invention comprises:

(A) a solid titanium catalyst component prepared by the above process, (B) an organoaluminum compound, and optionally (C) an electron donor.

The olefin polymerization process according to the invention comprises polymerizing or copolymerizing an olefin in the presence of the above-mentioned olefin polymerization catalyst.

DETAILED DESCRIPTION OF THE INVENTION

Figure 1:
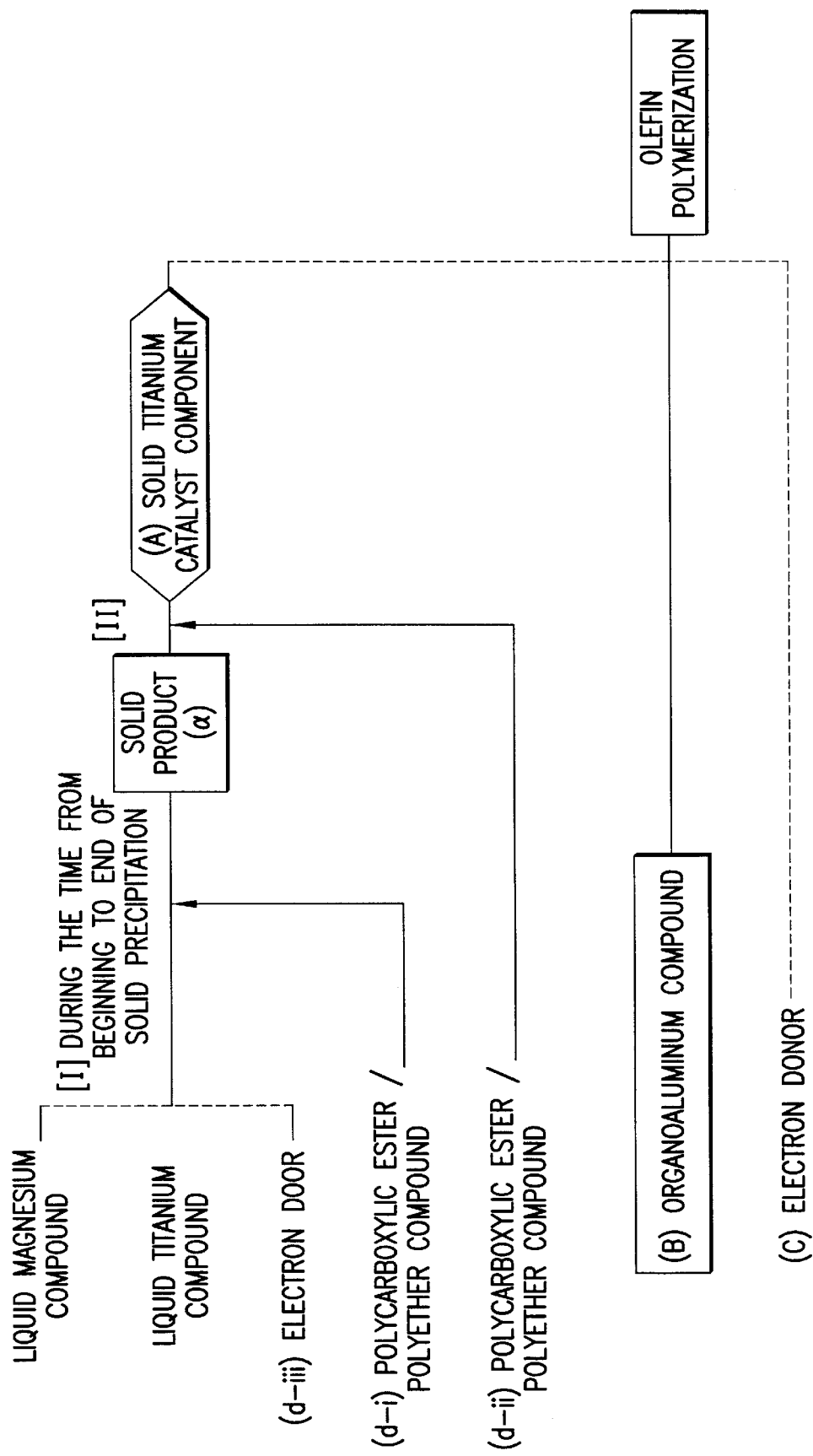
FIG. 1 shows steps of the process for preparing a solid titanium catalyst component according to the invention and shows steps of a process for preparing an olefin polymerization catalyst.

The process for preparing a solid titanium catalyst component according to the invention, the olefin polymerization catalyst containing a solid titanium catalyst component obtained by the process and the olefin polymerization process are described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

Preparation of Solid Titanium Catalyst Component (A)

FIG. 1 shows steps of the process for preparing a solid titanium catalyst component according to the invention and shows steps of a process for preparing an olefin polymerization catalyst.

The process of the invention comprises the steps of:

(I) contacting a liquid magnesium compound with a liquid titanium compound to precipitate a solid in the contact liquid (β), and adding an electron donor (d-i), which is selected from the group consisting of a polycarboxylic ester and a compound having two or more ether linkages present through plural atoms, to the contact liquid (β) during the time from beginning to end of the solid precipitation, to form a solid product (α) comprising titanium, magnesium, halogen and the electron donor (d-i); and then (II) contacting the solid product (α) obtained after completion of the solid precipitation with an electron donor (d-ii) selected from the group consisting of a polycarboxylic ester and a compound having two or more ether linkages present through plural atoms, to prepare a solid titanium catalyst component comprising titanium, magnesium, halogen, the electron donor (d-i) and the electron donor (d-ii).

First, the components used for forming the solid titanium catalyst component are described.

Liquid Magnesium Compound

The magnesium compound for use in the invention includes a magnesium compound having reduction ability and a magnesium compound having no reduction ability.

The magnesium compound having reduction ability is, for example, a magnesium compound represented by the following formula:

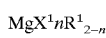

wherein n is a number of $0 \leq n < 2$, $R^1$ is hydrogen, an alkyl group of 1 to 20 carbon atoms, an aryl group or a cycloalkyl group, when n is 0, two of $R^1$ may be the same as or different from each other, and $X^1$ is halogen, hydrogen or an alkoxy group.

Examples of the magnesium compounds having reduction ability include:

dialkylmagnesium compounds, such as dimethylmagnesium, diethylmagnesium, dipropylmagnesium, dibutylmagnesium, diamylmagnesium, dihexylmagnesium, didecylmagnesium, octylbutylmagnesium and ethylbutylmagnesium;

alkylmagnesium halides, such as ethylmagnesium chloride, propylinagnesium chloride, butylmagnesium chloride, hexylmagnesium chloride and amylmagnesium chloride;

alkylmagnesium alkoxides, such as butylethoxymagnesium, ethylbutoxymagnesium and octylbutoxymagnesium; and butylmagnesium hydride.

Examples of the magnesium compounds having no reduction ability include:

magnesium halides, such as magnesium chloride, magnesium bromide, magnesium iodide and magnesium fluoride;

alkoxymagnesium halides, such as methoxymagnesium chloride, ethoxymagnesium chloride, isopropoxymagnesium chloride, butoxymagnesium chloride and octoxymagnesium chloride;

aryloxymagnesium halides, such as phenoxymagnesium chloride and methylphenoxymagnesium chloride;

alkoxymagnesiums, such as diethoxymagnesium, diisopropoxymagnesium, dibutoxymagnesium, di-n-octoxymagnesium, di-2-ethylhexoxymagnesium, and ethoxymethoxymagnesium;

aryloxymagnesiums, such as diphenoxymagnesium and dimethylphenoxymagnesium;

magnesium carboxylate, such as magnesium laurate and magensium stearate.

Also employable as the magnesium compounds having no reduction ability are metallic magnesium and hydrogenate magenesium.

These magnesium compounds having no reduction ability may be compounds derived from the aforementioned magnesium compounds having reduction ability or compounds derived during the preparation of the catalyst component. For deriving the magnesium compounds having no reduction ability from the magnesium compounds having reduction ability, for example, the magnesium compounds having reduction ability are brought into contact with polysiloxane compounds, halogen-containing silane compounds, halogen-containing aluminum compounds, esters, alcohols, halogen-containing compounds, or compounds having OH group or active carbon-oxygen bond. The magnesium compounds may be used in combination or two or more kinds.

For preparing the solid titanium catalyst component, other magnesium compounds than the above-mentioned can be also employed, but it is preferable that the magnesium compound takes a form of a halogen-containing magnesium compound in the finally obtained solid titanium catalyst component. Therefore, when a magnesium compound containing no halogen is used, the magnesium compound is preferably contacted with a halogen-containing compound during the preparation of the catalyst component.

Of the above compounds, preferable are the magnesium compounds having no reduction ability, and particularly preferable are the halogen-containing magnesium compounds. Of these, magnesium chloride, alkoxymagnesium chloride and aryloxymagnesium chloride are more preferable.

According to the invention, in the preparation of a solid titanium catalyst component, the magnesium compound is used in a liquid state (solution state).

A magnesium compound in a solid state can be made liquid by the use of an electron donor (d-iv). Examples of the electron donors (d-iv) include alcohols, phenols, ketones, aldehydes, ethers, amines, pyridines and metallic acid esters. Specifically, there can be mentioned:

alcohols having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol;

halogen-containing alcohols having 1 to 18 carbon atoms, such as trichloromethanol and trichloroethanol, trichlorohexanol;

phenols having 6 to 20 carbon atoms, which may have a lower alkyl group, such as phenol, cresol, xylenol, ethylphenol, propylphenol, nonylphenol, cumylphenol and naphthol;

ketones having 3 to 15 carbon atoms, such as acetone, methyl ethyl ketone, methyl isobutyl ketone, ethyl n-butyl ketone, acetophenone, benzophenone, benzoquinone and cyclohexanone;

aldehydes having 2 to 15 carbon atoms, such as acetaldehyde, propionaldehyde, octylaldehyde, benzaldehyde, tolualdehyde and naphthaldehyde;

ethers having 2 to 20 carbon atoms, such as methyl ether, ethyl ether, isopropyl ether, butyl ether, amyl ether, tetrahydrofuran, ethylbenzyl ether, ethylene glycol dibutyl ether, anisole and diphenyl ether;

amines, such as methylamine, ethylamine, dimethylamine, diethylamine, trimethylamine, triethylamine, tributylamine, tribenzylamine, tetramethylenediamine and hexamethylenediamine;

pyridines, such as pyridine, methylpyridine, ethylpyridine, propylpyridine, dimethylpyridine, ethylmethylpyridine, trimethylpyridine, phenylpyridine, benzylpyridine and pyridine chloride; and metallic acid esters, such as tetraethoxytitanium, tetra-n-propoxytitanium, tetra-i-propoxytitanium, tetrabutoxytitanium, tetrahexoxytitanium, tetrabutoxyzirconium and tetraethoxyzirconium.

Of these, preferably used are alcohols and metallic acid esters, and particularly preferably used are alcohols having 6 or more carbon atoms. When an alcohol having 6 or more carbon atoms is used to make the magnesium compound liquid, the alcohol is desirably used in an amount of not less than about 1 mol, preferably not less than 1.5 mol, based on 1 mol of the magnesium compound. There is no specific limitation on the upper limit of the amount of the alcohol, but from the economical viewpoint, the upper limit is preferably not so high and is preferably 40 mol based on 1 mol of the magnesium compound.

If an alcohol having 5 or less carbon atoms is used to make the magnesium compound liquid, the alcohol in an amount of usually not less than about 15 mol based on 1 mol of the magnesium compound is necessary.

The reaction between the solid magnesium compound and the electron donor (d-iv) is generally carried out by contacting the solid magnesium compound with the electron donor (d-iv) and then optionally heating them. The contact is conducted at a temperature of usually 0 to 200° C., preferably 20 to 180° C., more preferably 50 to 150° C.

The above reaction may be carried out in the presence of a hydrocarbon solvent. Examples of the hydrocarbon solvents include aliphatic hydrocarbons, such as pentane, hexane, heptane, octane, decane, dodecane, tetradecane and kerosine; alicyclic hydrocarbons, such as cyclopentane, methylcyclopentane, cyclohexane, methylcyclohexane and cyclooctane; halogenated hydrocarbons, such as dichloroethane, dichloropropane, trichloroethylene and chlorobenzene; and aromatic hydrocarbons, such as benzene, toluene and xylene.

Liquid Titanium Compound

The liquid titanium compound used in the invention is preferably a tetravalent titanium compound. The tetravalent titanium compound is, for example, a compound represented by the following formula:

wherein R is a hydrocarbon group, X is a halogen atom, and $0 \leq g \leq 4$.

Examples of such titanium compounds include:

titanium tetrahalides, such as $TiCl_4$, $TiBr_4$ and $TiCl_2Br_2$;

alkoxytitanium trihalides, such as $Ti(OCH_3)Cl_3$, $Ti(OC_2H_5)Cl_3$, $Ti(On\text{-}C_4H_9)Cl_3$, $Ti(OC_2H_5)Br_3$ and $Ti(O\text{-}iso\text{-}C_4H_9)Br_3$;

dialkoxytitanium dihalides, such as $Ti(OCH_3)_2Cl_2$, $Ti(OC_2H_5)_2Cl_2$, $Ti(On\text{-}C_4H_9)_2Cl_2$ and $Ti(OC_2H_5)_2Br_2$;

trialkoxytitanium monohalides, such as $Ti(OCH_3)_3Cl$, $Ti(OC_2H_5)_3Cl$, $Ti(On\text{-}C_4H_9)_3Cl$ and $Ti(OC_2H_5)_3Br$; and tetraalkoxytitaniums, such as $Ti(OCH_3)_4$, $Ti(OC_2H_5)_4$, $Ti(On\text{-}C_4H_9)_4$, $Ti(O\text{-}iso\text{-}C_4H_9)_4$ and $Ti(O\text{-}2\text{-}ethylhexyl)_4$.

Of these, preferable are titanium tetrahalides, and particularly preferable is titanium tetrachloride. These titanium compounds may be used in combination of two or more kinds. These titanium compounds may be used after diluted with hydrocarbons, halogenated hydrocarbons or aromatic hydrocarbons.

(d-i) Electron Donor

In the contact of the liquid magnesium compound with the liquid titanium compound, a polycarboxylic ester and/or a compound having two or more ether linkages present through plural atoms is used as the electron donor (d-i).

The polycarboxylic ester is represented by, for example, the following formula:

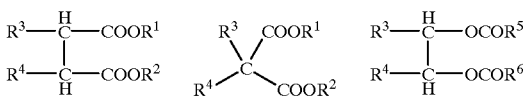

In the above formulas, $R^1$ is a substituted or unsubstituted hydrocarbon group, $R^2$, $R^5$ and $R^6$ are each hydrogen or a substituted or unsubstituted hydrocarbon group, $R^3$ and $R^4$ are each hydrogen or a substituted or unsubstituted hydrocarbon group, and at least one of $R^3$ and $R^4$ is preferably a substituted or unsubstituted hydrocarbon group. $R^3$ and $R^4$ may be linked to each other to form a cyclic structure. When the hydrocarbon groups $R^1$ to $R^6$ are substituted, the substituents contain hetero atoms such as N, O and S and have groups such as C—O—C, COOR, COOH, OH, $SO_3H$, —C—N—C— and $NH_2$.

Particular examples of the polycarboxylic acid esters include:

aliphatic polycarboxylic acid esters, such as diethyl succinate, dibutyl succinate, diethyl methylsuccinate, diisobutyl α-methylglutarate, diethyl methylmalonate, diethyl ethylmalonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, diisopropyl β-methylglutarate, diallyl ethylsuccinate, di-2-ethylhexyl fumarate, diethyl itaconate and dioctyl citraconate;

alicyclic polycarboxylic acid esters, such as diethyl 1,2-cyclohexanecarboxylate, diisobutyl 1,2-cyclohexanecarboxylate, diethyl tetrahydrophthalate and diethyl nadiate;

aromatic polycarboxylic acid esters, such as diisopropyl phthalate, diisobutyl phthalate, dineopentyl phthalate, di-2-ethylhexyl phthalate, monoethyl phthalate, dimethyl phthalate, methylethyl phthalate, monoisobutyl phthalate, diethyl phthalate, ethylisobutyl phthalate, di-n-propyl phthalate, di-n-butyl phthalate, di-n-heptyl phthalate, di-n-octyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; and heterocyclic polycarboxylic acid esters, such as 3,4-furandicarboxilic acid.

Other examples of the polycarboxylic acid esters are esters of long-chain dicarboxylic acids, such as diethyl adipate, diisobutyl adipate, diisopropyl sebacate, di-n-butyl sebacate, di-n-octyl sebacate and di-2-ethylhexyl sebacate.

Of the polycarboxylic esters, particularly preferable are phthalic esters represented by the following formula:

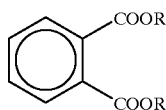

wherein R is a branched hydrocarbon group of 3 to 12 carbon atoms, and two of R may be the same or different.

In the above formula, the benzene nucleus may be substituted with a halogen atom or a lower hydrocarbon group.

Examples of the phthalic esters include diisopropyl phthalate, diisobutyl phthalate, dineopentyl phthalate, diheptyl phthalate and di-2-ethylhexyl phthalate. Particular examples of the diheptyl phthalates include diheptyl phthalates having a branched heptyl group, such as di(2-methylhexyl)phthalate, di(3-methylhexyl)phthalate, di(4-methylhexyl)phthalate, di(5-methylhexyl)phthalate, di(2,4-dimethylpentyl)phthalate, di(3,4-dimethylpentyl)phthalate, di(2,2-dimethylpentyl)phthalate, di(2,3-dimethylpentyl)phthalate, di(3,3-dimethylpentyl) phthalate, di(3-ethylpentyl)phthalate and di(2,2,3-trimethylbutyl)phthalate.

Also available are compounds having a combination of two different branched alkyl groups selected from among such branched alkyl groups as contained in the above-exemplified compounds.

Further, a phthalic diester which is a mixture of two or more kinds of the above compounds is also available.

For example, a mixture of diheptyl phthalates, wherein plural R groups in the above formula consist of 3-methylhexyl group (a %), 5-ethylhexyl group (b %) and 2,4-dimethylpentyl group (c %) (a+b+c=100%), is also preferably employed.

In the compound having two or more ether linkages present through plural atoms, (hereinafter, sometimes referred to as "polyether compound") the atom present between the ether linkages is at least one element selected from the group consisting of carbon, silicon, oxygen, sulfur, phosphorus and boron, and the number of atoms is 2 or greater. Of such compounds, preferable are compounds wherein relatively bulky substituents, specifically substituents of 2 or more (preferably 3 or more) carbon atoms having linear, branched or cyclic structure (preferably branched or cyclic structure), are bonded to the atoms present between the ether linkages. Also preferable are compounds wherein the atoms present between two or more ether linkages include plural carbon atoms, preferably 3 to 20 carbon atoms, more preferably 3 to 10 carbon atoms, particularly preferably 3 to 7 carbon atoms.

If such a polyether compound as mentioned above is used and if the later-described Al/Ti ratio in the prepolymerization is in the range of 0.5 to 2.5 mol/mol, particle properties of the resulting polymer particles, such as bulk density, can be improved.

The polyether compound is, for example, a compound represented by the following formula.

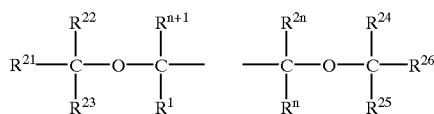

wherein n is an integer of $2 \leq n \leq 10$, $R^1$ to $R^{26}$ are each a substituent having at least one element selected from carbon, hydrogen, oxygen, halogen, nitrogen, sulfur, phosphorus, boron and silicon; groups optionally selected from $R^1$ to $R^{26}$, preferably from $R^1$ to $R^{2n}$, may form in cooperation a ring other than a benzene ring; and the main chain may contain an atom other than carbon.

Examples of the polyether compounds may include:
2-(2-ethylhexyl)-1,3-dimethoxypropane,
2-isopropyl-1,3-dimethoxypropane,
2-butyl-1,3-dimethoxypropane,
2-s-butyl-1,3-dimethoxypropane,
2-cyclohexyl-1,3-dimethoxypropane,
2-phenyl-1,3-dimethoxypropane,
2-cumyl-1,3-dimethoxypropane,
2-(2-phenylethyl)-1,3-dimethoxypropane,
2-(2-cyclohexylethyl)-1,3-dimethoxypropane,
2-(p-chlorophenyl)-1,3-dimethoxypropane, 2-(diphenylmethyl)-1,3-dimethoxypropane,
2-(1-naphthyl)-1,3-dimethoxypropane,
2-(2-fluorophenyl)-1,3-dimethoxypropane,
2-(1-decahydronaphthyl)-1,3-dimethoxypropane,
2-(p-t-butylphenyl)-1,3-dimethoxypropane,
2,2-dicyclohexyl-1,3-dimethoxypropane,
2,2-dicyclopentyl-1,3-dimethoxypropane,
2,2-diethyl-1,3-dimethoxypropane,
2,2-dipropyl-1,3-dimethoxypropane,
2,2-diisopropyl-1,3-dimethoxypropane,
2,2-dibutyl-1,3-dimethoxypropane,
2-methyl-2-propyl-1,3-dimethoxypropane,
2-methyl-2-benzyl-1,3-dimethoxypropane,
2-methyl-2-ethyl-1,3-dimethoxypropane,
2-methyl-2-isopropyl-1,3-dimethoxypropane,
2-methyl-2-phenyl-1,3-dimethoxypropane,
2-methyl-2-cyclohexyl-1,3-dimethoxypropane,
2,2-bis(p-chlorophenyl)-1,3-dimethoxypropane,
2,2-bis(2-cyclohexylethyl)-1,3-dimethoxypropane,
2-methyl-2-isobutyl-1,3-dimethoxypropane,
2-methyl-2-(2-ethylhexyl)-1,3-dimethoxypropane,
2,2-di-isobutyl-1,3-dimethoxypropane,
2,2-diphenyl-1,3-dimethoxypropane,
2,2-dibenzyl-1,3-dimethoxypropane,
2,2-bis (cyclohexylmethyl)-1,3-dimethoxypropane,
2,2-di-isobutyl-1,3-diethoxypropane,
2,2-di-isobutyl-1,3-dibutoxypropane,
2-isobutyl-2-isopropyl-1,3-dimethoxypropane,
2-(1-methylbutyl)-2-isopropyl-1,3-dimethoxypropane,
2-(1-methylbutyl)-2-s-butyl-1,3-dimethoxypropane,
2,2-di-s-butyl-1,3-dimethoxypropane,
2,2-di-t-butyl-1,3-dimethoxypropane,
2,2-dineopentyl-1,3-dimethoxypropane,
2-isopropyl-2-isopentyl-1,3-dimethoxypropane,
2-phenyl-2-isopropyl-1,3-dimethoxypropane,
2-phenyl-2-s-butyl-1,3-dimethoxypropane,
2-benzyl-2-isopropyl-1,3-dimethoxypropane,
2-benzyl-2-s-butyl-1,3-dimethoxypropane,
2-phenyl-2-benzyl-1,3-dimethoxypropane,
2-cyclopentyl-2-isopropyl-1,3-dimethoxypropane,
2-cyclopentyl-2-s-butyl-1,3-dimethoxypropane,
2-cyclohexyl-2-isopropyl-1,3-dimethoxypropane,
2-cyclohexyl-2-s-butyl-1,3-dimethoxypropane,
2-isopropyl-2-s-butyl-1,3-dimethoxypropane,
2-cyclohexyl-2-cyclohexylmethyl-1,3-dimethoxypropane,
2,3-diphenyl-1,4-diethoxybutane
2,3-dicyclohexyl-1,4-diethoxybutane,
2,2-dibenzyl-1,4-diethoxybutane,
2,3-dicyclohexyl-1,4-diethoxybutane,
2,3-di-isopropyl-1,4-diethoxybutane,
2,2-bis(p-methylphenyl)-1,4-dimethoxybutane,
2,3--bis(p-chlorophenyl)-1,4-dimethoxybutane,
2,3-bis(p-fluorophenyl)-1,4-dimethoxybutane,
2,4-diphenyl-1,5-dimethoxypentane,
2,5-diphenyl-1,5-dimethoxyhexane,
2,4-di-isopropyl-1,5-dimethoxypentane,
2,4-di-isobutyl-1,5-dimethoxypentane,
2,4-diisoamyl-1,5-dimethoxypentane,
3-methoxymethyltetrahydrofuran,
3-methoxymethyldioxane,
1,3-di-isobutoxypropane,
1,2-di-isobutoxypropane,
1,2-di-isobutoxyethane,
1,3-di-isoamyloxypropane,
1,3-di-isoneopentyloxyethane,
1,3-di-neopentyloxypropane,
2,2-tetramethylene-1,3-dimethoxypropane,
2,2-pentamethylene-1,3-dimethoxypropane,
2,2-hexamethylene-1,3-dimethoxypropane,
1,2-bis(methoxymethyl)cyclohexane,
2,8-dioxaspiro[5,5]undecane,
3,7-dioxabicyclo[3,3,1]nonane,
3,7-dioxabicyclo[3,3,0]octane,
3,3-di-isobutyl-1,5-oxononane,
6,6-isobutyldioxoheptane,
1,1-dimethoxymethylcyclopentane,
1,1-bis(dimethoxymethyl)cyclohexane,
1,1-bis(methoxymethyl)bicyclo[2,2,1]heptane,
1,1-dimethoxymethylcyclopentane,
2-methyl-2-methoxymethyl-1,3-dimethoxypropane,
2-cyclohexyl-2-ethoxymethyl-1,3-diethoxypropane,
2-cyclohexyl-2-methoxymethyl-1,3-dimethoxypropane,
2,2-di-isobutyl-1,3-dimethoxycyclohexane,
2-isopropyl-2-isoamyl-1,3-dimethoxycyclohexane,
2-cyclohexyl-2-methoxymethyl-1,3-dimethoxycyclohexane,
2-isopropyl-2-methoxymethyl-1,3-dimethoxycyclohexane,
2-isobutyl-2-methoxymethyl-1,3-dimethoxycyclohexane,
2-cyclohexyl-2-ethoxymethyl-1,3-diethoxycyclohexane,
2-cylohexyl-2-ethoxymethyl-1,3-dimethoxycyclohexane,
2-isopropyl-2-ethoxymethyl-1,3-diethoxycyclohexane,
2-isopropyl-2-ethoxymethyl-1,3-dimethoxycyclohexane,
2-isobutyl-2-ethoxymethyl-1,3-diethoxycyclohexane,
2-isobutyl-2-ethoxymethyl-1,3-dimethoxycyclohexane,
tris(p-methoxyphenyl)phosphine,
methylphenylbis(methoxymethyl)silane,
diphenylbis(methoxymethyl)silane,
methylcyclohexylbis(methoxymethyl)silane,
di-t-butylbis(methoxymethyl)silane,
cyclohexyl-t-butylbis(methoxymethyl)silane and
i-propyl-t-butylbis(methoxymethyl)silane.

Of these polyether compounds, desirable examples are 1,3-diethers. Particularly, more desirable examples are:
2-isopropyl-2-isobutyl-1,3-dimethoxy propane,
2-isopropyl-2-sec -butyl-1,3-dimethoxy propane,
2,2-di-isobutyl-1,3-dimethoxy propane,
2-isopropyl-2-isopentyl-1,3-dimethoxy propane,
2,2-dicyclohexyl-1,3-dimethoxy propane,
2,2-bis(cyclohexylmethyl)-1,3-dimethoxy propane,
2-cyclohexyl-2-isopropyl-1,3-dimethoxy propane,
2,2-diphenyl-1,3-dimethoxypropane and
2-cyclopentyl-2-isopropyl-1,3-dimethoxypropane.

Preparation of Solid Titanium Catalyst Component

According to the invention, in the preparation of a solid titanium catalyst component from the liquid magnesium compound, the liquid titanium compound and the electron donor (d-i), (I) the liquid magnesium compound is first contacted with the liquid titanium compound to precipitate a solid in the contact liquid (β), and during the time from beginning to end of the solid precipitation, the electron donor (d-i) selected from the group consisting of the polycarboxylic ester and the polyether compound is added to the contact liquid (β), to form a solid product (α) comprising titanium, magnesium, halogen and the electron donor (d-i)

The contact liquid (β) generally contains, before addition of the electron donor (d-i) thereto, an electron donor (d-iii) selected from the group consisting of a monocarboxylic ester, an aliphatic carboxylic acid, an acid anhydride, a ketone, a monoether, an aliphatic carbonate, an alkoxy group-containing alcohol, an aryloxy group-containing alcohol, an organosilicon compound having Si—O—C bond and an organophosphorus compound having P—O—C bond.

Examples of the electron donors (d-iii) include:

monocarboxylic esters, such as methyl formate, methyl acetate, ethyl acetate, vinyl acetate, propyl acetate, i-butyl acetate, t-butyl acetate, octyl acetate, cyclohexyl acetate, methyl chloroacetate, ethyl dichloroacetate, ethyl propionate, methyl pyruvate, ethyl pivalate, methyl butyrate, ethyl valerate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate and ethyl ethoxybenzoate;

aliphatic carboxylic acids, such as formic acid, acetic acid, propionic acid, butyric acid and valeric acid;

acid anhydrides, such as acetic anhydride, phthalic anhydride, maleic anhydride, benzoic anhydride, trimellitic anhydride and tetrahydrophthalic anhydride;

ketones, such as acetone, methyl ethyl ketone, methyl isobutyl ketone, ethyl n-butyl ketone, acetophenone, benzophenone, benzoquinone and cyclohexanone;

monoethers, such as methyl ether, ethyl ether, isopropyl ether, butyl ether, amyl ether, ethylbenzyl ether and anisole;

aliphatic carbonates, such as dimethyl carbonate, diethyl carbonate and ethylene carbonate;

alkoxy group-containing alcohols, such as butyl cellosolve and ethyl cellosolve;

organosilicon compounds having Si—O—C bond, such as methyl silicate, ethyl silicate and diphenyldimethoxysilane, preferably organosilicon compounds represented by the formula $R^1_x R^2_y Si(OR^3)_z$ ($R^1$ and $R^2$ are each independently a hydrocarbon group or halogen, $R^3$ is a hydrocarbon group, $0 \leq x < 2$, $0 \leq y < 2$, and $0 < z \leq 4$); and organophosphorus compounds having P—O—C bond, such as trimethyl phosphite and triethyl phosphite.

The electron donors (d-iii) may be used in combination of two or more kinds.

The electron donor (d-iii) has only to be contained in the contact liquid (β) between the liquid magnesium compound and the liquid titanium compound, before the electron donor (d-i) is added to the contact liquid (β) For example, the electron donor (d-iii) may be incorporated into any one or both of the liquid magnesium compound and the liquid titanium compound, followed by contacting those compounds with each other, or the electron donor (d-iii) may be added to the contact liquid (β) between the liquid magnesium compound and the liquid titanium compound prior to the addition of the electron donor (d-i) to the contact liquid (β).

When the contact between the liquid magnesium compound and the liquid titanium compound is carried out in the presence of the electron donor (d-iii), a solid product (α) having excellent particle shape can be obtained.

In the contact between the liquid magnesium compound and the liquid titanium compound, another electron donor (d-v) may be further used in an amount not detrimental to the object of the present invention, in addition to the electron donor (d-i) selected from the group consisting of the polycarboxylic ester and the polyether compound.

Examples of the electron donors (d-v) include:

the organosilicon compounds previously described as the electron donors (d-iv) for making the magnesium compound liquid;

organosilicon compounds described later as the electron donors (C);

acid amides, such as N,N-dimethylacetamide, N,N-diethylbenzamide and N,N-dimethyltoluamide;

acid halides having 2 to 15 carbon atoms, such as acetyl chloride, benzoyl chloride, toluyl chloride and anisoyl chloride;

nitriles, such as acetonitrile, benzonitrile and trinitrile;

pyrroles, such as pyrrole, methylpyrrole and dimethylpyrrole;

pyrrolines;

pyrrolidines;

indoles;

nitrogen-containing cyclic compounds, such as piperidines, quinolines and isoquinolines; and oxygen-containing cyclic compounds, such as tetrahydrofuran, 1,4-cineol, 1,8-cineol, pinolfuran, methylfuran, dimethylfuran, diphenylfuran, benzofuran, coumaran, phthalan, tetrahydropyran, pyran and dihydropyran.

In the step (I) for forming the solid product (α), the liquid magnesium is contacted with the liquid titanium compound to precipitate a solid in the contact liquid (β), and during the time from beginning to end of the solid precipitation, the electron donor (d-i) selected from the group consisting of the polycarboxylic ester and the polyether compound is added to the contact liquid (β).

In more detail, the liquid magnesium compound is contacted with the liquid titanium compound in the presence of the electron donor (d-iii) at a temperature of usually −70 to 200° C., preferably −50 to 150° C., more preferably −30 to 130° C., to precipitate a solid. The liquid temperature of the liquid magnesium compound may be different from the liquid temperature of the liquid magnesium compound.

In the present invention, it is preferable that the liquid magnesium compound is contacted with the liquid titanium compound in the presence of the electron donor (d-iii) at a low temperature at first, followed by elevating the temperature slowly, to precipitate a solid. The electron donor (d-i) is preferably added during this temperature rise, and specifically, it is preferable that the electron donor (d-i) is added when a solid is precipitated in the contact liquid (β) in an amount of not less than 20% by weight and less than 100% by weight, preferably 50 to 99% by weight, more preferably 70 to 95% by weight, based on 100% by weight of the solid finally precipitated. During the time from beginning to end of the solid precipitation in the contact liquid (β), the electron donor (d-i) may be divided and added plural times.

The solid precipitation ratio can be evaluated by actual measurement in accordance with the method described in the examples, which are described later, or it can be evaluated based on the precipitation time, the precipitation temperature, etc. measured in the model experiment.

Though the amounts of the components used for preparing the solid product (α) vary depending on the preparation process and cannot be determined indiscriminately, the titanium compound can be used in an amount of usually 0.01 to 1,000 mol, preferably 0.1 to 200 mol, based on 1 mol of the magnesium compound. The electron donor (d-iii) is desirably used in an amount of 0.01 to 1 mol, preferably 0.02 to 7 mol, more preferably 0.05 to 0.5 mol, based on 1 mol of the magnesium compound.

The electron donor (d-i) can be used in an amount of 0.005 to 9.995 mol, preferably 0.01 to 4.99 mol, based on 1 mol of the magnesium compound.

It is desirable that the total amount of the electron donor (d-i) and the later-described electron donor (d-ii) is in the range of usually 0.01 to 10 mol, preferably 0.1 to 5 mol, and this total amount is preferably such an amount as corresponds to the amount of an electron donor commonly used for preparing a solid titanium catalyst component.

The molar ratio of the electron donor (d-i) to the electron donor (d-ii) used in the later-described step (II) is preferably 10/90 to 90/10, more preferably less than 1 ((d-i)/(d-ii)<1), most preferably less than 0.5 ((d-i)/(d-ii)<0.5).

In the step (I), two or more compounds selected from the group consisting of the polycarboxylic esters and the polyether compounds are employable as the electron donor (d-i).

In the contact of the components (a) to (d) to produce a solid, the hydrocarbon solvents described above in the preparation of the liquid magnesium compound (a) can be employed if necessary.

In the preparation of the solid titanium catalyst component, carrier compounds, and organic or inorganic compounds which contain silicon, phosphorus, aluminum or the like and are commonly used as reaction assistants are employable in addition to the above compounds.

Examples of the carrier compounds include metallic oxides, such as $Al_2O_3$, $SiO_2$, $B_2O_3$, MgO, CaO, $TiO_2$, ZnO, $SnO_2$, BaO and ThO; and resins, such as a styrene/divinylbenzene copolymer. Of these, preferable are $TiO_2$, $Al_2O_3$, $SiO_2$ and a styrene/divinylbenzene copolymer.

By virtue of the above contact, a solid product ($\alpha$) comprising titanium, magnesium, halogen and the electron donor (d-i) is obtained.

According to the present invention, in the next step (II), the solid product ($\alpha$) obtained after completion of the solid precipitation is contacted with an electron donor (d-ii) selected from the group consisting of a polycarboxylic ester and a polyether compound.

For example, the solid product ($\alpha$) can be contacted with the electron donor (d-ii) by adding the electron donor (d-ii) to the contact liquid ($\beta$) containing the solid product ($\alpha$), said contact liquid ($\beta$) being obtained after the solid precipitation is completed in the step (I). It is desirable that the electron donor (d-ii) is added to the contact liquid ($\beta$) obtained after completion of the solid precipitation, while maintaining the contact liquid ($\beta$) at the temperature at which the solid precipitation is completed, specifically, 70 to 150° C., preferably 80 to 140° C.

It is also possible that the electron donor (d-ii) is added after the solid product ($\alpha$) is temporarily taken out from the contact liquid ($\beta$) by filtration or the like.

In the present invention, it is preferable that the electron donor (d-ii) is added to the contact liquid ($\beta$) containing the solid product ($\alpha$).

When the solid product ($\alpha$) is temporarily filtered as described above, the solid product ($\alpha$) may be resuspended in an inert medium such as hexane or in a liquid catalyst component such as titanium tetrachloride, followed by adding the electron donor (d-ii) to the resulting suspension.

In the present invention, the molar ratio of the electron donor (d-i) to the electron donor (d-ii) is preferably 10/90 to 90/10, more preferably less than 1 ((d-i)/(d-ii)<1), most preferably less than 0.5 ((d-i)/(d-ii)<0.5), as previously described. Further, the electron donor (d-ii) is desirably used in an amount of usually 0.005 to 9.995 mol, preferably 0.01 to 4.99 mol, based on 1 mol of the magnesium compound contained in the solid product ($\alpha$). The electron donor (d-ii) can be divided and added two or more times.

Examples of the compounds employable as the electron donor (d-ii) in the invention are the same as those previously described for the electron donor (d-i). Those compounds can be used in combination of two or more kinds as the electron donor (d-ii).

The electron donor (d-ii) may be the same as or different from the electron donor (d-i). For example, the electron donor (d-i) and the electron donor (d-ii) may be both polycarboxylic esters, or may be both polyether compounds. It is also possible that the electron donor (d-i) is a polycarboxylic ester and the electron donor (d-ii) is a polyether compound, or the reverse thereof is also possible. It is particularly desirable that different compounds are used in combination as the electron donors (d-i) and (d-ii).

When the electron donor (d-i) for forming the solid product ($\alpha$) in the step (I) and the electron donor (d-ii) for use in the step (II) are both polycarboxylic esters, it is desirable that the electron donor (d-i) is diheptyl phthalate and the electron donor (d-ii) is diisobutyl phthalate, whereby a solid titanium catalyst component exhibiting particularly high activity can be obtained.

In the step (II), the solid product ($\alpha$) can be further contacted with a titanium compound. The contact between the solid product ($\alpha$) and the titanium compound may be carried out simultaneously with the contact between the solid product ($\alpha$) and the electron donor (d-ii), or may be carried out before or after the contact therebetween. As the titanium compound, the aforesaid liquid titanium compound is employable, and it may be the same as or different from the titanium compound used in the step (I).

The titanium compound can be used in an amount of 0.01 to 1,000 mol, preferably 0.1 to 200 mol, based on 1 mol of the magnesium compound in the solid product ($\alpha$).

The solid titanium catalyst component (A) obtained as above comprises magnesium, titanium, halogen, the electron donor (d-i) and the electron donor (d-ii). In detail, the solid titanium catalyst component (A) desirably comprises titanium in an amount of 0.1 to 10% by weight, preferably 0.2 to 7.0% by weight, magnesium and halogen in the total amount of 95 to 30% by weight, and the electron donors (d-i) and (d-ii) in the total amount of 0.5 to 30% by weight.

Though the solid titanium catalyst component (A) obtained above can be used for polymerization as it is, it is preferably used after washed with a hydrocarbon solvent at 0 to 200° C.

As the washing solvent, the hydrocarbon solvent previously described in the preparation of the liquid magnesium compound is employable. Of the previously exemplified hydrocarbon solvents, the aliphatic hydrocarbon solvent or the aromatic hydrocarbon solvent is preferably employed.

In the washing, the hydrocarbon solvent is used in an amount of usually 1 to 10,000 ml, preferably 5 to 5,000 ml, more preferably 10 to 1,000 ml, based on 1 g of the solid titanium catalyst component (solid matter).

The washing is preferably carried out until elimination of titanium comes to an end by hexane washing at room temperature.

An olefin polymerization catalyst containing the solid titanium catalyst component prepared above can polymerize an olefin with extremely high activity.

The olefin polymerization catalyst according to the invention is formed from:

(A) the solid titanium catalyst component, (B) an organoaluminum compound, and optionally (C) an electron donor.

(B) Organoaluminum Compound

The organoaluminum compounds are represented by, for example, the following formula:

wherein $R^a$ is a hydrocarbon group of 1 to 12 carbon atoms, X is halogen or hydrogen, and n is 1 to 3.

In the above formula, $R^a$ is a hydrocarbon group of 1 to 12 carbon atoms, e.g., an alkyl group, a cycloalkyl group or an aryl group. Particular examples of these groups include methyl, ethyl, n-propyl, isopropyl, isobutyl, pentyl, hexyl, octyl, cyclopentyl, cyclohexyl, phenyl and tolyl.

Examples of such organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compounds are compounds represented by the following formula:

$$R^a{}_n AlY_{3-n}$$

wherein $R^a$ is the same as above, Y is —$OR^b$ group, —$OSiR^c{}_3$ group, —$OAlR^d{}_2$ group, —$NR^e{}_2$ group, —$SiR^f{}_3$ group or —$N(R^g)AlR^h{}_2$ group, n is 1 to 2, $R^b$, $R^c$, $R^d$ and $R^h$ are each methyl, ethyl, isopropyl, isobutyl, cyclohexyl, phenyl or the like, $R^e$ is hydrogen, methyl, ethyl, isopropyl, phenyl, trimethylsilyl or the like, and $R^f$ and $R^g$ are each methyl, ethyl or the like.

Examples of such organoaluminum compounds include:

(i) compounds of the formula $R^a{}_nAl(OR^b)_{3-n}$, e.g., dimethylaluminum methoxide, diethylaluminum ethoxide and diisobutylaluminum methoxide;

(ii) compounds of the formula $R^a{}_nAl(OSiR^c)_{3-n}$, e.g., $Et_2Al(OSiMe_3)$, $(iso\text{-}Bu)_2Al(OSiMe_3)$ and $(iso\text{-}B)_2Al(OSiEt_3)$;

(iii) compounds of the formula $R^a{}_nAl(OAlR^d{}_2)_{3-n}$; e.g., $Et_2AlOAlEt_2$ and $(iso\text{-}Bu)_2AlOAl(iso\text{-}Bu)_2$;

(iv) compounds of the formula $R^a{}_nAl(NR^e{}_2)_{3-n}$, e.g., $Me_2AlNEt_2$, $Et_2AlNHMe$, $Me_2AlNHEt$, $Et_2AlN(Me_3Si)_2$ and $(iso\text{-}Bu)_2AlN(Me_3Si)_2$;

(v) compounds of the formula $R^a{}_nAl(SiR^f{}_3)_{3-n}$, e.g., $(iso\text{-}Bu)_2AlSiMe_3$; and (vi) compounds of the formula $R^a{}_nAl[N(R^g)-AlR^h{}_2]_{3-n}$, e.g., $Et_2AlN(Me)-AlEt_2$ and $(iso\text{-}Bu)_2AlN(Et)Al(iso\text{-}Bu)_2$.

Also employable are compounds analogous to the above organoaluminum compounds, for example, organoaluminum compounds wherein two or more aluminum atoms are linked to each other through an oxygen atom or a nitrogen atom. Examples of such compounds include $(C_2H_5)_2AlOAl(C_2H_5)_2$, $(C_4H_9)_2AlOAl(C_4H_9)_2$, $(C_2H_5)_2AlN(C_2H_5)Al(C_2H_5)_2$, and aluminoxanes such as methylaluminoxane.

The alkyl complex compounds of Group I metals and aluminum are represented by the following formula:

$$M^1AlR^j{}_4$$

wherein $M^1$ is Li, Na or K, and $R^j$ is a hydrocarbon group of 1 to 15 carbon atoms.

Examples of such compounds include $LiAl(C_2H_5)_4$ and $LiAl(C_7H_{15})_4$.

Of the organoaluminum compounds mentioned above, preferable are organoaluminum compounds represented by the formulas $R^a{}_3Al$, $R^a{}_nAl(OR^b)_{3-n}$ and $R^a{}_nAl(OAlR^d{}_2)_{3-n}$.

In the present invention, the organometallic compounds may be used in combination of two or more kinds.

(C) Electron Donor

In the preparation of the olefin polymerization catalyst of the invention, an electron donor (C) may be optionally used. As the electron donor (C), organosilicon compounds which are represented by, for example, the following formula (i) is employed.

$$R_nSi(OR')_{4-n} \qquad (i)$$

wherein R and R' are each a hydrocarbon group, and n is 1, 2 or 3.

Examples of the organosilicon compounds represented by the above formula include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxyailane, bis-o-tolyldimethoxysilane, bis-m-tolyldimethoxysilane, bis-p-tolyldimethoxysilane, bis-p-tolyldiethoxysilane, bisethylphenyldimethoxysilane, ethyltrimethoxysilane, ethyltriethoxysilane, vinyltrimethoxysilane, methyltrimethoxysilane, n-proyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, n-butyltriethoxysilane, phenyltriethoxysilane, γ-aminopropyltriethoxysilane, chlorotriethoxysilane, ethyltriisopropoxysilane, vinyltributoxysilane, trimethylphenoxysilane, methyltriallyloxysilane, vinyltris(β-methoxyethoxysilane), vinyltriacetoxysilane and dimethyltetraethoxydisiloxane. Also employable are ethyl silicate and butyl silicate.

The organosilicon compound represented by the formula (i) is preferably a compound specifically represented by the following formula (ii):

$$R^a{}_nSi(OR^b)_{4-n} \qquad (ii)$$

wherein n is 1, 2 or 3; when n is 1, $R^a$ is a secondary or tertiary hydrocarbon group; when n is 2 or 3, at least one of $R^a$ is a secondary or tertiary hydrocarbon group, $R^a$s may be the same or different; $R^b$ is a hydrocarbon group of 1 to 4 carbon atoms; and when 4−n is 2 or 3, $OR^b$s may be the same or different.

In the organosilicon compound of the formula (ii) having a bulky group, the secondary or tertiary hydrocarbon group is, for example, a cyclopentyl group, a cyclopentenyl group, a cyclopentadienyl group, a substituted cyclopentyl, cyclopentenyl or cyclopentadienyl group, or a hydrocarbon group wherein the carbon adjacent to Si is secondary or tertiary carbon.

Examples of the substituted cyclopentyl groups include cyclopentyl groups having alkyl groups, such as 2-mehtylcyclopentyl, 3-methylcyclopentyl, 2-ethylcyclopentyl, 2-n-butylcyclopentyl, 2,3-dimethylcyclopentyl, 2,4-dimethylcyclopentyl, 2,5- dimethylcyclopentyl, 2,3-diethylcyclopentyl, 2,3,4-trimethylcyclopentyl, 2,3,5-trimethylcyclopentyl, 2,3,4-triethylcyclopentyl, tetramethylcyclopentyl and tetraethylcyclopentyl.

Examples of the substituted cyclopentenyl groups include cyclopentenyl groups having alkyl groups, such as 2-methylcyclopentenyl, 3-methylcyclopentenyl, 2-ethylcyclopentenyl, 2-n-butylcyclopentenyl, 2,3-dimethylcyclopentenyl, 2,4-dimethylcyclopentenyl, 2,5-dimethylcyclpentenyl, 2,3,4-trimethylcyclopentenyl, 2,3,5-trimethylcyclopentenyl, 2,3,4-triethylcyclopentenyl, tetramethylcyclopentenyl and tetraethylcyclopentenyl.

Examples of the substituted cyclopentadienyl groups include cyclopentadienyl groups having alkyl groups, such as 2-mehtylcyclopentadienyl, 3-methylcyclopentadienyl, 2-ethylcyclopentadienyl, 2-n-butylcyclopentadienyl, 2,3-dimethylcyclopentadienyl, 2,4-dimethylcyclopentadienyl, 2,5-dimethylcyclopentadienyl, 2,3-diethylcyclopentadienyl, 2,3,4-trimethylcyclopentadienyl, 2,3,5-trimethylcyclopentadienyl, 2,3,4-triethylcyclopentadienyl, 2,3,4,5-tetramethylcyclopentadienyl, 2,3,4,5-tetraethylcyclopentadienyl, 1,2,3,4,5-pentamethylcyclopentadienyl and 1,2,3,4,5-pentaethylcyclopentadienyl.

Examples of the hydrocarbon groups wherein the carbon adjacent to Si is secondary carbon include i-propyl, s-butyl, s-amyl and α-methylbenzyl. Examples of the hydrocarbon groups wherein the carbon adjacent to Si is tertiary carbon include t-butyl, t-amyl, α,α'-dimethylbenzyl and adamantyl.

When n is 1, examples of the organosilicon compounds represented by the formula (ii) include trialkoxysilanes, such as cyclopentyltrimethoxysilane, 2-methylcyclopentyltrimethoxysilane, 2,3-dimethylcyclopentyltrimethoxysilane, cyclopentyltriethoxysilane, iso-butyltriethoxysilane, t-butyltriethoxysilane, cyclohexyltrimethoxysilane, cyclohexyltriethoxysilane, 2-norbornanetrimethoxysilane and 2-norbornanetriethoxysilane.

When n is 2, examples of the organosilicon compounds represented by the formula (ii) include dialkoxysilanes, such as dicyclopentyldiethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane and 2-norbornanemethyldimethoxysilane.

Of the organosilicon compounds of the formula (ii) wherein n is 2, preferable are dimethoxysilane compounds represented by the following formula (iii):

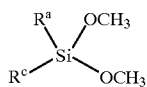

(iii)

wherein $R^a$ and $R^c$ are each independently a cyclopentyl group, a substituted cyclopentyl group, a cyclopentenyl group, a substituted cyclopentenyl group, a cyclopentadienyl group, a substituted cyclopentadienyl group or a hydrocarbon group wherein the carbon adjacent to Si is secondary or tertiary carbon.

Examples of the organosilicon compounds represented by the formula (iii) include:
dicyclopentyldimethoxysilane,
dicyclopentenyldimethoxysilane,
dicyclopentadienyldimethoxysilane,
di-t-butyldimethoxysilane,
di(2-methylcyclopentyl)dimethoxysilane,
di(3-methylcyclopentyl)dimethoxysilane,
di(2-ethylcyclopentyl)dimethoxysilane,
di(2,3-dimethylcyclopentyl)dimethoxysilane,
di(2,4-dimethylcyclopentyl)dimethoxysilane,
di(2,5-dimethylcyclopentyl)dimethoxysilane,
di(2,3-diethylcyclopentyl)dimethoxysilane,
di(2,3,4-trimethylcyclopentyl)dimethoxysilane,
di(2,3,5-trimethylcyclopentyl)dimethoxysilane,
di(2,3,4-trimethylcyclopentyl)dimethoxysilane,
di(tetramethylcyclopentyl)dimethoxysilane,
di(tetraethylcyclopentyl)dimethoxysilane,
di(2-methylcyclopentenyl)dimethoxysilane,
di(3-methylcyclopentenyl)dimethoxysilane,
di(2-ethylcyclopentenyl)dimethoxysilane,
di(2-n-butylcyclopentenyl)dimethoxysilane,
di(2,3-dimethylcyclopentenyl)dimethoxysilane,
di(2,4-dimethylcyclopentenyl)dimethoxysilane,
di(2,5-dimethylcyclopentenyl)dimethoxysilane,
di(2,3,4-trimethylcyclopentenyl)dimethoxysilane,
di (2,3,5-trimethylcyclopentenyl)dimethoxysilane,
di(2,3,4-trimethylcyclopentenyl)dimethoxysilane,
di(tetramethylcyclopentenyl)dimethoxysilane,
di(tetraethylcyclopentenyl)dimethoxysilane,
di(2-n methylcyclopentadienyl)dimethoxysilane,
di(3-methylcyclopentadienyl)dimethoxysilane,
di(2-ethylcyclopentadienyl)dimethoxysilane,
di(2-n-butylcyclopentadienyl)dimethoxysilane,
di(2,3-dimethylcyclopentadienyl)dimethoxysilane,
di(2,4-dimethylcyclopentadienyl)dimethoxysilane,
di(2,5-dimethylcyclopentadienyl)dimethoxysilane,
di(2,3-diethylcyclopentadienyl)dimethoxysilane,
di(2,3,4-trimethylcyclopentadienyl)dimethoxysilane,
di(2,3,5-trimethylcyclopentadienyl)dimethoxysilane,
di(2,3,4-triethylcyclopentadienyl)dimethoxysilane,
di(2,3,4,5-tetramethylcyclopentadienyl)dimethoxysilane,
di(2,3,4,5- tetraethylcyclopentadienyl)dimethoxysilane,
di(1, 2,3,4,5-pentamethylcyclopentadienyl) dimethoxysilane,
di(1,2,3,4,5-pentaethylcyclopentadienyl)dimethoxysilane,
di-t-amyldimethoxysilane,
di(α,α'-dimethyl benzyl)dimethoxysilane,
di(adamantyl)dimethoxysilane,
adamantyl-t-butyldimethoxysilane,
cyclopentyl-t-butyldimethoxysilane,
diisopropyldimethoxysilane,
di-s-butyldimethoxysilane,
di-s-amyldimethoxysilane, and
isopropyl-s-butyldimethoxysilane.

When n is 3, examples of the organosilicon compounds represented by the formula (ii) include monoalkoxysilanes, such as tricyclopentylmethoxysilane,
tricyclopentylethoxysilane,
dicyclopentylmethylmethoxysilane,
dicyclopentylethylmethoxysilane,
dicyclopentylmethylethoxysilane,
cyclopentyldimethylmethoxysilane, cyclopentyldiethylmethoxysilane and cyclopentyldimethylethoxysilane.

Of the above compounds, preferable are
ethyltriethoxysilane, n-propyltriethoxysilane,
t-butyltriethoxysilane, vinyltriethoxysilane,
phenyltriethoxysilane, vinyltributoxysilane,
diphenyldimethoxysilane, phenylmethyldimethoxysilane
bis-p-tolyldimethoxysilane,
p-tolylmethyldimethoxysilane,
dicyclohexyldimethoxysilane,
cyclohexylmethyldimethoxysilane, 2-norbornanetriethoxysilane,
2-norbornanemethyldimethoxysilane,
phenyltriethoxysilane, hexenyltrimethxysilane,
cyclopentyltriethoxysilane, tricyclopentylmethoxysilane,
cyclopentyldimethylmethoxysilane and dimethoxysilanes represented by the formula (iii). Among them, particularly preferable are dimethoxysilanes represented by the formula (iii), specifically dicyclopentyldimethoxysilane, di-t-butyldimethoxysilane, di(2-methylcyclopentyl)dimethoxysilane, di(3-methylcyclopentyl)dimethoxysilane and di-t-amyldimethoxysilane.

Also employable as the electron donors (C) are:

2,6-substituted piperidines;

2,5-substituted piperidines;

substituted methylenediamines, such as N,N,N',N'-tetramethylmethylenediamine and N,N,N',N'-tetraethylmethylenediamine;

nitrogen-containing compounds, such as substituted imidazolidines (e.g., 1,3-dibenzylimidazolidine and 1,3-dibenzyl-2-phenylimidazolidine);

phosphorus-containing compounds, such as phosphites (e.g., triethyl phosphite, tri-n-propyl phosphite, triisopropyl phosphite, tri-n-butyl phosphite, triisobutyl phosphite, diethyl-n-butyl phosphite and diethylphenyl phosphite);

oxygen-containing compounds, such as 2,6-substituted tetrahydropyrans and 2,5-substituted tetrahydropyrans.

The electron donors (C) may be used in combination of two or more kinds.

In the preparation of the olefin polymerization catalyst of the invention using the component (A), the component (B) and optionally the component (C), other components can be employed if desired.

In the present invention, a prepolymerized catalyst may be formed from the above-mentioned components in the presence of the olefin polymerization catalyst.

The pre(co)polymerized catalyst can be formed by prepolymerizing an olefin in the present of the solid titanium catalyst component (A), the organoaluminum compound (B) and optionally the electron donor (C).

Examples of the olefins used for the prepolymerization include α-olefins of 2 or more carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene and 1-eicosene. Further, the later-described vinyl compounds and polyene compounds are also employable for the prepolymerization. These compounds may be used in combination of two or more kinds.

The olefin used for the prepolymerization may be the same as or different from the later-described olefin used for the polymerization.

There is no specific limitation on the method of performing the prepolymerization. For example, the prepolymerization can be carried out under such conditions that the olefins and the polyene compounds are liquid state, or it can be carried out in the presence of an inert solvent or in a gas phase. It is preferable that the olefins and the catalyst components are added to an inert hydrocarbon solvent and the prepolymerization is carried out under relatively mild conditions. The prepolymerization may be conducted under such conditions that the resulting prepolymer is dissolved in the polymerization medium or under such conditions that the prepolymer is not dissolved therein, but the prepolymerization is preferably conducted under such conditions that the prepolymer is not dissolved in the polymerization medium.

It is desirable that the prepolymerization is carried out at a temperature of usually about −20 to +100° C., preferably about −20 to +80° C., more preferably −10 to +40° C.

The prepolymerization may be carried out by any of batchwise, semi-continuous and continuous processes.

The concentration of the catalyst in the prepolymerization system may be higher than that of the catalyst in the polymerization system.

Though the concentrations of the catalyst components in the prepolymerization system vary depending on the types of the catalyst components used, etc., the concentration of the solid titanium catalyst component (A) is usually about 0.001 to 5,000 mmol, preferably about 0.01 to 1,000 mmol, particularly preferably 0.1 to 500 mmol, in terms of titanium atom, based on 1 liter of the polymerization volume.

The organoaluminum compound (B) is used in such an amount that a pre(co)polymer is produced in an amount of 0.01 to 2,000 g, preferably 0.03 to 1,000 g, more preferably 0.05 to 200 g, based on 1 g of the solid titanium catalyst component (A). That is, the organoaluminum compound (B) is usually used in an amount of usually about 0.1 to 1,000 mol, preferably about 0.5 to 500 mol, particularly preferably 1 to 100 mol, based on 1 mol of titanium in the solid titanium catalyst component (A).

In the prepolymerization, the electron donor (C) can be used, if necessary, in an amount of usually 0.01 to 50 mol, preferably 0.05 to 30 mol, more preferably 0.1 to 10 mol, based on 1 mol of the titanium atom in the solid titanium catalyst component (A).

A molecular weight modifier such as hydrogen can be used in the prepolymerization.

When the prepolymerized catalyst is obtained in the form of a suspension, the suspension may be used as such in the subsequent polymerization process, or the prepolymerized catalyst separated from the suspension can be used in the polymerization process.

The above-mentioned prepolymerized catalyst can be used with the organoaluminum compound (B) and the electron donor (C). However, the prepolymerized catalyst may be used singly as the olefin polymerization catalyst. If the electron donor (C) is not used in the prepolymerization, the resulting prepolymerized catalyst may be used together with the electron donor (C) to form an olefin polymerization catalyst. Further, the electron donor (C) may be used neither in the prepolymerization nor in the polymerization.

In the olefin polymerization catalyst according to the invention, other components than the above-mentioned ones, which are useful for olefin polymerization, may be contained.

Process for Olefin Polymerization

In the process for olefin polymerization according to the invention, an olefin is polymerized or copolymerized in the presence of the olefin polymerization catalyst comprising the solid titanium catalyst component (A), the organometallic compound catalyst component (B), and optionally, the electron donor (C), or in the presence of the prepolymerized catalyst.

Examples of the olefins employable herein include α-olefins of 2 or more carbon atoms, which are the same as those used for the prepolymerization Also employable are:

cycloolefins, such as cyclopentene, cycloheptene, norbornene, 5-ethyl-2-norbornene, tetracyclododecene and 2-ethyl-1,4,5,8-dimethano-1,2,3,4,4a,5,8,8a-octahydronaphthalene; and vinyl compounds, such as styrene, dimethylstyrenes, allylnaphthalene, allylnorbornane, vinylnaphthalenes, allyltoluenes, allylbenzene, vinylcyclopentane, vinylcyclohexane, vinylcycloheptane and allyltrialkylsilanes.

Of these, preferably used are ethylene, propylene, 1-butene, 3-methyl-1-butene, 3-methyl-1-pentene, 4-methyl-1-pentene, vinylcyclohexene, dimethyistyrene, allyltrimethylsilane and allylnaphthalene.

The olefin may be copolymerized with a small amount of a diene compound.

Examples of the diene compounds include 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1, 6-decadiene, 7-methyl-1,6-decadiene, 6-methyl-1,6-undecadiene, 1,7-octadiene, 1,9-decadiene, isoprene, butadiene, ethylidene norbornene, vinyl norbornene and dicyclopentadiene. These diene compounds may be used in combination of two or more kinds.

In the process of the invention, the polymerization can be carried out as any of liquid phase polymerization, such as solution polymerization or suspension polymerization, and gas phase polymerization.

When the polymerization is carried out as slurry polymerization, the aforesaid inert organic solvent is employable as the solvent, or an olefin which is liquid at the reaction temperature is also employable as the solvent.

In the polymerization, the solid titanium catalyst component (A) or the prepolymerized catalyst is used in an amount of usually about 0.001 to 100 mmol, preferably about 0.005 to 20 mmol, in terms of titanium atom, based on 1 liter of the polymerization volume.

The organoaluminum compound (B) is used in such an amount that the amount of the metal atom in the compound (B) becomes usually about 1 to 2,000 mol, preferably about 2 to 500 mol, based on 1 mol of the titanium atom in the polymerization system.

The electron donor (C) may be used or may not be used. If necessary, the electron donor (C) is used in an amount of usually about 0.001 to 10 mol, preferably 0.01 to 5 mol, based on 1 mol of the metal atom in the organoaluminum compound (B).

As described above, if the prepolymerized catalyst is used in the polymerization, none of the organoaluminum compound (B) and the electron donor (C) may be used according to circumstances. When the olefin polymerization catalyst is formed from the prepolymerized catalyst and the component (B) and/or the component (C), the component (B) and/or the component (C) is used in the above-mentioned amount.

If hydrogen is used in the polymerization, the molecular weight of the resulting polymer can be modified, to thereby obtain a polymer having a high melt flow rate.

In the process for olefin polymerization according to the invention, the polymerization is carried out at a temperature of usually about 20 to 300° C., preferably about 50 to 150° C., under a pressure of usually atmospheric pressure to 100 kg/cm$^2$, preferably about 2 to 50 kg/cm$^2$, though these conditions vary depending on the type of the olefin, the type of the polymerization, etc.

In the process of the invention, the polymerization can be carried out batchwise, semi-continuously or continuously. The polymerization can be conducted in two or more stages under different reaction conditions.

In the present invention, a homopolymer of an olefin may be prepared, or a random or block copolymer of two or more olefins may be prepared.

Effect of the Invention

By the use of an olefin polymerization catalyst comprising the solid titanium catalyst component obtained by the present invention, olefins can be polymerized with an extremely high activity, and besides polyolefins of high stereoregularity can be produced when α-olefins of 3 or more carbon atoms are polymerized.

EXAMPLE

The present invention is further described with reference to the following examples, but it should be construed that the invention is in no way limited to those examples.

Properties of polypropylene obtained in the following examples were measured by the methods described below.

(1) Bulk density (BD)

The bulk density was measured in accordance with ASTM D 1895.

(2) Melt flow rate (MFR)

The melt flow rate was measured at 230° C. under a load of 2.16 kg in accordance with ASTM D 1238.

(3) 23° C. n-Decane-soluble component quantity

The 23° C. n-decane-soluble component quantity (t-DS) in the polymer was defined as a proportion of the total quantity of the 23° C. n-decane-soluble component in the polymer obtained as a powder after polymerization and the solvent-soluble polymer to the quantity of the whole polymer, and was determined in the following manner.

Into a 1-liter flask, 3 g of a sample (powdered polymer), 20 mg of 2,6-di-tert-butyl-4-methylphenol and 500 ml of n-decane were introduced, and they were heated at 145° C. to give a solution. Then, the solution was cooled to 23° C. over a period of 8 hours and maintained at 23° C. for 8 hours. The solid polymer precipitated is separated from the n-decane solution containing the dissolved polymer by filtration using a glass filter.

The liquid phase was dried at 150° C. under reduced pressure until a constant weight was reached, and the resulting dry product was weighed. The percentage (p-DS) of the weight of the dissolved polymer to the weight of the sample was calculated.

From the percentage (p-DS), the weight of the powdered polymer obtained after polymerization and the weight of the solvent-soluble polymer, the 23° C. n-decane-soluble component quantity (t-DS) was calculated by the following formula:

$$t-DS\,(\text{wet}\%) = \frac{(\text{weight of powedered polymer}) \times \frac{p-DS}{100} + (\text{weight of solvent soluble polymer})}{(\text{weight of powdered polymer}) + (\text{weight of solvent-soluble polymer})} \times 100$$

In the following examples, the solid precipitation ratio in the contact liquid (β) obtained by the contact of the liquid magnesium compound with the liquid titanium compound in the preparation of a solid titanium catalyst component was determined in the following manner.

7.14 g (75 mmol) of anhydrous magnesium chloride, 37.5 ml of decane and 35.1 ml (225-mmol) of 2-ethylhexyl alcohol were heated at 130° C. for 2 hours to prepare a homogeneous solution. To the solution, 1.67 g (11.3 mmol) of phthalic anhydride was added, and they were mixed and stirred at 130° C. for 1 hour to give a solution.

The homogeneous solution obtained above was cooled to room temperature, and the whole amount of the solution was dropwise added, over a period 1 hour, to 200 ml (1.8 mol) of titanium tetrachloride (TiCl$_4$) maintained at −20° C.

The temperature of the resulting liquid mixture (contact liquid (β)) was raised to 20° C. (i.e., temperature at which the electron donor (d-i) was added in the following Examples), and the mixture in the slurry state was filtered with keeping the temperature of the system.

The quantity of Mg contained in the solid portion and the quantity of Mg contained in the liquid phase portion were measured by a plasma emission spectroscopic analyzer, and thereby a precipitation ratio of solid (MgCl$_2$) was determined. The obtained value was taken as the solid precipitation ratio in the contact liquid (β).

With respect to the above-mentioned contact liquid (β), the solid precipitation ratio at 20° C. was 82%. The solid precipitation ratios at 92° C. and 110° C. of the precipitation temperature which were measured in the same manner at 20° C. were both 100%.

Example 1

Preparation of Solid Titanium Catalyst Component (A-1)

(1) 7.14 g (75 mmol) of anhydrous magnesium chloride, 37.5 ml of decane and 35.1 ml (225 mmol) of 2-ethylhexyl alcohol were heated at 130° C. for 2 hours to prepare a homogeneous solution. To the solution, 1.67 g (11.3 mmol) of phthalic anhydride was added, and they were mixed and stirred at 130° C. for 1 hour to give a solution.

(2) The homogeneous solution obtained above was cooled to room temperature, and the whole amount of the solution was dropwise added to 200 ml (1.8 mol) of titanium tetrachloride (TiCl$_4$) maintained at −20° C. over a period of 1 hour.

(3) The temperature of the resulting liquid mixture was raised to 20° C., and to the mixture was added 3.01 ml (11.25 mmol) of diisobutyl phthalate (DIBP), followed by raising the temperature to 110° C. After the temperature reached 110° C., the mixture was stirred at the same temperature for 2 hours.

(4) Then, the solid was recovered by hot filtration, suspended in 275 ml of TiCl$_4$ and heated to 110° C. Thereafter, 2.01 ml (7.5 mmol) of DIBP was added, and the mixture was heated at 110° C. for 2 hours.

(5) The resulting solid was recovered by hot filtration. The solid was resuspended in 275 ml of TiCl$_4$, and the suspension was heated again at 110° C. for 2 hours. These operations were repeated twice.

(6) After the reaction was completed, the solid was recovered by hot filtration again, and the solid was sufficiently washed with decane at 110° C. and with hexane at room temperature until no titanium compound liberated in the washing liquid was detected.

The solid titanium catalyst component (A-1) obtained above was stored as a hexane slurry. A part of the hexane slurry was dried to analyze composition of the solid titanium catalyst component.

In the solid titanium catalyst component (A-1), 3.7 % by weight of titanium, 16% by weight of magnesium and 18.5% by weight of DIBP were contained.

Preparation of Prepolymerized Catalyst (1)

To a 200-ml glass reactor purged with nitrogen, 68.2 ml of purified hexane was introduced, and the system was cooled to 18° C. Then, 1.2 mmol of triethylaluminum (TEA) and 0.4 mmol (in terms of titanium atom) of the solid titanium catalyst component (A-1) obtained above were added. Thereafter, a propylene gas was fed to the reactor at a feed rate of 1.39 l/hr to perform polymerization at 20° C. for 1 hour with stirring.

After the polymerization was completed, the reaction mixture was taken out under a nitrogen atmosphere, and the liquid portion was removed to separate a solid (prepolymerized catalyst). The solid was resuspended in decane. The amount of the prepolymer was 3.0 g per 1 g of the solid titanium catalyst component.

Polymerization

To a 1-liter autoclave purged with nitrogen, 400 ml of purified heptane was introduced, and then 0.4 mmol of triethylaluminum (TEA), 0.08 mmol of dicyclopentyldimethoxysilane (DCPMS) and 0.004 mmol (in terms of titanium atom) of the prepolymerized catalyst (1) obtained above were introduced at 60° C. in a propylene atmosphere.

Then, 240 ml of hydrogen was fed, and the system was heated to 70° C. This temperature was maintained for 1 hour to perform polymerization of propylene. During the polymerization, the pressure was kept at 5 kg/cm$^2$-G.

After the polymerization was completed, a slurry containing a polymer produced was filtered to separate the slurry into a white powder and a liquid phase portion.

The yield of the polymer obtained as the white powder was 76.4 g.

The liquid phase portion was concentrated to obtain 0.1 g of a solvent-soluble polymer.

The polymerization activity, MFR, apparent bulk density (BD) and the 23° C. n-decane-soluble component quantity (t-DS) defined as a proportion of the total weight of the 23° C. n-decane-soluble component in the powdered polymer and the solvent-soluble polymer to the weight of the whole polymer are set forth in Table 1.

Example 2

Preparation of Solid Titanium Catalyst Component (A-2)

The operations (1) to (4) of Example 1 were carried out. That is, a homogeneous solution of anhydrous magnesium chloride was mixed with titanium tetrachloride, and the temperature of the liquid mixture was raised to 20° C. To the mixture was added 3.01 ml (11.25 mmol) of diisobutyl phthalate (DIBP), and the temperature of the resulting mixture was raised to 110° C. After the temperature reached 110° C., the mixture was stirred at the same temperature for 2 hours. Then, the solid was collected by hot filtration, suspended in 275 ml of TiCl$_4$ and heated to 110° C. Thereafter, 2.01 ml (7.5 mmol) of DIBP was added, and the mixture was heated at 110° C. for 2 hours.

(5) The resulting solid was recovered by hot filtration. The solid was resuspended in 55 ml of TiCl$_4$ and 220 ml of toluene, and the suspension was heated again at 115° C. for 2 hours. These operations were repeated twice.

Then, the washing operation (6) of Example 1 was carried out.

The solid titanium catalyst component (A-2) obtained above was stored as a hexane slurry. A part of the hexane slurry was dried to analyze composition of the solid titanium catalyst component.

In the solid titanium catalyst component (A-2), 1.7% by weight of titanium, 22% by weight of magnesium and 13.7% by weight of DIBP were contained.

Preparation of Prepolymerized Catalyst (2)

Prepolymerization was carried out in the same manner as in Example 1, except that the solid titanium catalyst component (A-2) was used in place of the solid titanium catalyst component (A-1), to prepare a prepolymerized catalyst (2).

Polymerization

Polymerization was carried out in the same manner as in Example 1, except that the prepolymerized catalyst (2) was used in place of the prepolymerized catalyst (1). The results are set forth in Table 1.

Example 3
Preparation of Solid Titanium Catalyst Component (A-3)

The operations (1) and (2) of Example 1 were carried out.

(3) The temperature of the above-obtained liquid mixture containing magnesium chloride and titanium tetrachloride was raised to 20° C., and to the mixture was added 4.13 ml (11.25 mmol) of the below-described diheptyl phthalate mixture (DHP), followed by raising the temperature to 92° C. After the temperature reached 92° C., the mixture was stirred at the same temperature for 2 hours.

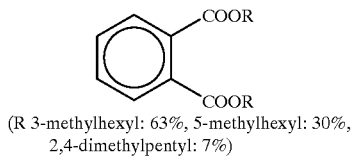

(R 3-methylhexyl: 63%, 5-methylhexyl: 30%, 2,4-dimethylpentyl: 7%)

(4) Then, the solid was recovered by hot filtration, suspended in 275 ml of $TiCl_4$ and heated to 92° C. Thereafter, 2.75 ml (7.5 mmol) of DHP was added, and the mixture was heated at 92° C. for 2 hours.

(5) The resulting solid was recovered by hot filtration. The solid was resuspended in 275 ml of $TiCl_4$, and the suspension was heated again at 92° C. for 2 hours. These operations were repeated twice.

(6) After the reaction was completed, the solid was collected by hot filtration again, and the solid was sufficiently washed with decane at 92° C. and with hexane at room temperature until no titanium compound liberated in the washing liquid was detected.

The solid titanium catalyst component (A-3) obtained above was stored as a hexane slurry. A part of the hexane slurry was dried to analyze composition of the solid titanium catalyst component.

In the solid titanium catalyst component (A-3), 2.0% by weight of titanium, 19% by weight of magnesium and 13.6% by weight of DHP were contained.

Preparation of Prepolymerized Catalyst (3)

Prepolymerization was carried out in the same manner as in Example 1, except that the solid titanium catalyst component (A-3) was used in place of the solid titanium catalyst component (A-1), to prepare a prepolymerized catalyst (3).

Polymerization

Polymerization was carried out in the same manner as in Example 1, except that the prepolymerized catalyst (3) was used in place of the prepolymerized catalyst (1). The results are set forth in Table 1.

Example 4
Preparation of Solid Titanium Catalyst Component (A-4)

The procedure of Example 1 was repeated, except that the operation (3) was carried out as follows.

(3) The temperature of the liquid mixture containing magnesium chloride and titanium tetrachloride obtained through the operations (1) and (2) of Example 1 was raised to 20° C., and to the mixture was added 5.51 ml (15.0 mmol) of diheptyl phthalate (DHP), followed by raising the temperature to 92° C. After the temperature reached 92° C., the mixture was stirred at the same temperature for 2 hours.

Then, the same operations (4) and (5) of Example 1 were carried out. The details are as follows.

(4) The solid was recovered by hot filtration, suspended in 275 ml of $TiCl_4$ and heated to 110° C. Then, 2.01 ml (7.5 mmol) of DIBP was added, and the mixture was heated at 110° C. for 2 hours.

(5) The resulting solid was recovered by hot filtration. The solid was resuspended in 275 ml of $TiCl_4$, and the suspension was heated again at 110° C. for 2 hours. These operations were repeated twice.

Then, the washing operation (6) of Example 1 was carried out.

The solid titanium catalyst component (A-4) obtained above was stored as a hexane slurry. A part of the hexane slurry was dried to analyze composition of the solid titanium catalyst component.

In the solid titanium catalyst component (A-4), 3.4% by weight of titanium, 16% by weight of magnesium, 4.0% by weight of DHP and 14.8% by weight of DIBP were contained.

Preparation of Prepolymerized Catalyst (4)

Prepolymerization was carried out in the same manner as in Example 1, except that the solid titanium catalyst component (A-4) was used in place of the solid titanium catalyst component (A-1), to prepare a prepolymerized catalyst (4).

Polymerization

Polymerization was carried out in the same manner as in Example 1, except that the prepolymerized catalyst (4) was used in place of the prepolymerized catalyst (1). The results are set forth in Table 1.

Example 5
Preparation of Solid Titanium Catalyst Component (A-5)

The procedure of Example 1 was repeated, except that the operations (3) and (5) were carried out as follows.

(3) The temperature of the liquid mixture containing magnesium chloride and titanium tetrachloride obtained through the operations (1) and (2) of Example 1 was raised to 20° C., and to the mixture was added 4.13 ml (11.25 mmol) of diheptyl phthalate, followed by raising the temperature to 92° C. After the temperature reached 92° C., the mixture was stirred at the same temperature for 2 hours.

(4) The operation (4) of Example 1 was carried out. That is, the solid was recovered by hot filtration, suspended in 275 ml of $TiCl_4$ and heated to 110° C. Then, 2.01 ml (7.5 mmol) of DIBP was added, and the mixture was heated at 110° C. for 2 hours.

(5) The operation (5) of Example 2 was carried out. That is, the resulting solid was recovered by hot filtration. The solid was resuspended in 275 ml of $TiCl_4$, and the suspension was heated again at 110° C. for 2 hours. These operations were repeated twice.

Then, the washing operation (6) of Example 1 was carried out.

The solid titanium catalyst component (A-5) obtained above was stored as a hexane slurry. A part of the hexane slurry was dried to analyze composition of the solid titanium catalyst component.

In the solid titanium catalyst component (A-5), 1.5% by weight of titanium, 20% by weight of magnesium, 2.7% by weight of DHP and 10.5% by weight of DIBP were contained.

Preparation of Prepolymerized Catalyst (5)

Prepolymerization was carried out in the same manner as in Example 1, except that the solid titanium catalyst component (A-5) was used in place of the solid titanium catalyst component (A-1), to prepare a prepolymerized catalyst (5).

Polymerization

Polymerization was carried out in the same manner as in Example 1, except that the prepolymerized catalyst (5) was used in place of the prepolymerized catalyst (1). The results are set forth in Table 1.

Example 6
Preparation of Solid Titanium Catalyst Component (A-6)

The procedure of Example 1 was repeated, except that the operations (3) and (4) were carried out as follows and the operation (5) was not carried out.

(3) The operation (3) of Example 2 was carried out. That is, the temperature of the liquid mixture containing magnesium chloride and titanium tetrachloride obtained through the operations (1) and (2) of Example 1 was raised to 20° C., and to the mixture was added 4.13 ml (11.25 mmol) of diheptyl phthalate, followed by raising the temperature to 92° C. After the temperature reached 92° C., the mixture was stirred at the same temperature for 2 hours.

(4) The resulting solid was recovered by hot filtration. The solid was resuspended in 275 ml of $TiCl_4$, the suspension was heated again at 110° C., and 0.60 ml (2.25 mmol) of DIBP was added to the suspension. Then, the resulting mixture was heated at 110° C. for 2 hours. These operations were repeated three times.

Then, the washing operation (6) of Example 1 was carried out.

The solid titanium catalyst component (A-6) obtained above was stored as a hexane slurry. A part of the hexane slurry was dried to analyze composition of the solid titanium catalyst component.

In the solid titanium catalyst component (A-6), 2.5% by weight of titanium, 18% by weight of magnesium, 3.6% by weight of DHP and 12% by weight of DIBP were contained.

Preparation of Prepolymerized Catalyst (6)

Prepolymerization was carried out in the same manner as in Example 1, except that the solid titanium catalyst component (A-6) was used in place of the solid titanium catalyst component (A-1), to prepare a prepolymerized catalyst (6).

Polymerization

Polymerization was carried out in the same manner as in Example 1, except that the prepolymerized catalyst (6) was used in place of the prepolymerized catalyst (1). The results are set forth in Table 1.

Example 7
Preparation of Solid Titanium Catalyst Component (A-7)

The procedure of Example 1 was repeated, except that the operations (3) to (5) were carried out as follows.

(3) The temperature of the liquid mixture containing magnesium chloride and titanium tetrachloride obtained through the operations (1) and (2) of Example 1 was raised to 20° C., and to the mixture was added 4.33 ml (18.75 mmol) of 2-isopropyl-2-isobutyl-1,3-dimethoxypropane (PBDME), followed by raising the temperature to 110° C. After the temperature reached 110° C., the mixture was stirred at the same temperature for 2 hours.

(4) The solid was recovered by hot filtration, suspended in 275 ml of $TiCl_4$ and heated to 110° C. Then, 0.43 ml (1.88 mmol) of PBDME was added, and the mixture was heated at 110° C. for 1.5 hours.

(5) The solid was recovered by hot filtration and suspended in 275 ml of $TiCl_4$. Then, 0.43 ml (1.88 mmol) of PBDME was added, and the mixture was heated at 110° C. for 1.5 hours.

Then, the washing operation (6) of Example 1 was carried out.

The solid titanium catalyst component (A-7) obtained above was stored as a hexane slurry. A part of the hexane slurry was dried to analyze composition of the solid titanium catalyst component.

In the solid titanium catalyst component (A-7), 2.2% by weight of titanium, 19% by weight of magnesium and 15.0% by weight of PBDME were contained.

Preparation of Prepolymerized Catalyst (7)

Prepolymerization was carried out in the same manner as in Example 1, except that the solid titanium catalyst component (A-7) was used in place of the solid titanium catalyst component (A-1), to prepare a prepolymerized catalyst (7).

Polymerization

Polymerization was carried out in the same manner as in Example 1, except that the prepolymerized catalyst (7) was used in place of the prepolymerized catalyst (1), cyclohexylmethyldimethoxysilane (CMMS) was used in place of DCPMS, and the feed amount of hydrogen was varied to 100 ml. The results are set forth in Table 1.

Example 8

Polymerization

Polymerization was carried out in the same manner as in Example 1, except that CMMS was not used. The results are set forth in Table 1.

Comparative Example 1
Preparation of Solid Titanium Catalyst Component (A-8)

The operations (1) and (2) of Example 1 were carried out. (The operation (3) which was addition of DIBP at 20° C. in Example 1 was not carried out.)

(4) The temperature of the liquid mixture containing magnesium chloride and titanium tetrachloride obtained through the operations (1) and (2) of Example 1 was raised to 110° C. over a period of 4 hours. When the temperature reached 110° C., 5.03 ml (18.8 mmol) of DIBP was added, and the mixture was stirred at the same temperature for 2 hours.

(5) The solid was recovered by hot filtration. The solid was resuspended in 275 ml of $TiCl_4$, and the suspension was heated again at 110° C. for 2 hours. These operations were repeated three times.

Then, the washing operation (6) of Example 1 was carried out.

The solid titanium catalyst component (A-8) obtained above was stored as a hexane slurry. A part of the hexane slurry was dried to analyze composition of the solid titanium catalyst component.

In the solid titanium catalyst component (A-8), 2.1% by weight of titanium, 18% by weight of magnesium, 58 % by weight of chloride and 10.9% by weight of DIBP were contained.

Preparation of Prepolymerized Catalyst (8)

Prepolymerization was carried out in the same manner as in Example 1, except that the solid titanium catalyst component (A-8) was used in place of the solid titanium catalyst component (A-1), to prepare a prepolymerized catalyst (8).

Polymerization

Polymerization was carried out in the same manner as in Example 1, except that the prepolymerized catalyst (8) was used in place of the prepolymerized catalyst (1). The results are set forth in Table 1.

Comparative Example 2
Preparation of Solid Titanium Catalyst Component (A-9)

The operations (1), (2) and (4) of Example 1 were carried out. (The operation (3) of Example 1 was not carried out.)

Then, the operation (5) of Comparative Example 1 and the operation (5) of Example 2 were carried out. The details are as follows.

(5) Similarly to the operation (5) of Comparative Example 1, the solid was recovered by hot filtration, suspended in 275 ml of $TiCl_4$ and heated at 110° C. for 2 hours. Then, similarly to the operation (5) of Example 2, the operations of recovering the solid by hot filtration, suspending the solid in 55 ml of TiCl$_4$ and 220 ml of toluene and heating the resulting suspension at 115° C. for 2 hours were repeated twice.

Then, the washing operation (6) of Example 1 was carried out.

The solid titanium catalyst component (A-9) obtained above was stored as a hexane slurry. A part of the hexane slurry was dried to analyze composition of the solid titanium catalyst component.

In the solid titanium catalyst component (A-9), 1.9% by weight of titanium, 24% by weight of magnesium and 6.3% by weight of DIBP were contained.

Preparation of Prepolymerized Catalyst (9)

Prepolymerization was carried out in the same manner as in Example 1, except that the solid titanium catalyst component (A-9) was used in place of the solid titanium catalyst component (A-1), to prepare a prepolymerized catalyst (9).

Polymerization

Polymerization was carried out in the same manner as in Example 1, except that the prepolymerized catalyst (9) was used in place of the prepolymerized catalyst (1). The results are set forth in Table 1.

Comparative Example 3

Preparation of Solid Titanium Catalyst Component (A-10)

The procedure of Example 3 was repeated, except that the operation (3) of adding DHP at 20° C. was not carried out and the operations (4) and (5) were carried out as follows.

(4) The temperature of the liquid mixture containing magnesium chloride and titanium tetrachloride obtained through the operations (1) and (2) of Example 3 was raised to 92° C. When the temperature reached 92° C., 6.88 ml (18.8 mmol) of DHP was added, and the mixture was stirred at the same temperature for 2 hours.

(5) The resulting solid was recovered by hot filtration. The solid was resuspended in 275 ml of TiCl$_4$, and the suspension was heated again at 92° C. for 2 hours. These operations were repeated three times.

Then, the washing operation (6) of Example 3 was carried out.

The solid titanium catalyst component (A-10) obtained above was stored as a hexane slurry. A part of the hexane slurry was dried to analyze composition of the solid titanium catalyst component.

In the solid titanium catalyst component (A-10), 2.2% by weight of titanium, 19% by weight of magnesium and 11.0% by weight of DHP were contained.

Preparation of Prepolymerized Catalyst (10)

Prepolymerization was carried out in the same manner as in Example 1, except that the solid titanium catalyst component (A-10) was used in place of the solid titanium catalyst component (A-1), to prepare a prepolymerized catalyst (10).

Polymerization

Polymerization was carried out in the same manner as in Example 1, except that the prepolymerized catalyst (10) was used in place of the prepolymerized catalyst (1). The results are set forth in Table 1.

Comparative Example 4

Preparation of Solid Titanium Catalyst Component (A-11)

The procedure of Example 7 was repeated, except that the operation (3) of adding PBDME at 20° C. was not carried out and the operations (4) and (5) were carried out as follows.

(4) The temperature of the liquid mixture containing magnesium chloride and titanium tetrachloride obtained through the operations (1) and (2) of Example 7 was raised to 110° C. When the temperature reached 110 ° C., 5.19 ml (22.51 mmol) of PBDME was added, and the mixture was stirred at the same temperature for 2 hours.

(5) The solid was recovered by hot filtration, suspended in 275 ml of TiCl and heated at 110° C. for 2 hours. (The PBDME was not added.)

Then, the washing operation (6) of Example 7 was carried out.

The solid titanium catalyst component (A-11) obtained above was stored as a hexane slurry. A part of the hexane slurry was dried to analyze composition of the solid titanium catalyst component.

In the solid titanium catalyst component (A-11), 2.3% by weight of titanium, 19% by weight of magnesium and 10.0% by weight of PBDME were contained.

Preparation of Prepolymerized Catalyst (11)

Prepolymerization was carried out in the same manner as in Example 1, except that the solid titanium catalyst component (A-11) was used in place of the solid titanium catalyst component (A-1), to prepare a prepolymerized catalyst (11).

Polymerization

Polymerization was carried out in the same manner as in Example 7, except that the prepolymerized catalyst (11) was used in place of the prepolymerized catalyst (7). The results are set forth in Table 1.

Comparative Example 5

Preparation of Solid Titanium Catalyst Component (A-12)

The procedure of Example 7 was repeated, except that the operation (3) of adding PBDME at 20° C. was not carried out and the operations (4) and (5) were carried out as follows.

(4) The temperature of the liquid mixture containing magnesium chloride and titanium tetrachloride obtained through the operations (1) and (2) of Example 7 was raised to 110° C. When the temperature reached 110° C., 2.59 ml (11.25 mmol) of PBDME was added, and the mixture was stirred at the same temperature for 2 hours.

(5) The solid was recovered by hot filtration, suspended in 275 ml of TiCl$_4$ and heated to 110° C. Then, 1.73 ml (7.5 mmol) of PBDME was added, and the mixture was heated at 110° C. for 2 hours.

Then, the washing operation (6) of Example 7 was carried out.

The solid titanium catalyst component (A-12) obtained above was stored as a hexane slurry. A part of the hexane slurry was dried to analyze composition of the solid titanium catalyst component.

In the solid titanium catalyst component (A-12), 1.8% by weight of titanium, 20% by weight of magnesium and 17.7% by weight of PBDME were contained.

Preparation of Prepolymerized Catalyst (12)

Prepolymerization was carried out in the same manner as in Example 1, except that the solid titanium catalyst component (A-12) was used in place of the solid titanium catalyst component (A-1), to prepare a prepolymerized catalyst (12).

Polymerization

Polymerization was carried out in the same manner as in Example 7, except that the prepolymerized catalyst (12) was used in place of the prepolymerized catalyst (7). The results are set forth in Table 1.

TABLE 1

| | Donor in the preparation of solid titanium catalyst component | | | Polymerization activity | | BD | MFR | t-DS |
|---|---|---|---|---|---|---|---|---|
| | (d-i) in the solid precipitation | (d-ii) in the contact with solid | (C) Donor in the polymerization | (g-PP/mmol-Ti) | (g-PP/g-cat.) | (g/ml) | (g/10 min.) | (wt. %) |
| Ex. 1 | DIBP*[1] | DIBP | DCPMS*[4] | 19100 | 8500 | 0.43 | 4.5 | 0.9 |
| Ex. 2 | DIBP | DIBP | DCPMS | 44800 | 10300 | 0.41 | 3.1 | 0.6 |
| Ex. 3 | DHP*[2] | DHP | DCPMS | 33000 | 12900 | 0.43 | 4.3 | 1.6 |
| Ex. 4 | DHP | DIBP | DCPMS | 26600 | 13900 | 0.41 | 5.0 | 1.2 |
| Ex. 5 | DHP | DIBP | DCPMS | 40900 | 12800 | 0.42 | 3.9 | 0.9 |
| Ex. 6 | DHP | DIBP | DCPMS | 45300 | 14600 | 0.41 | 3.7 | 1.4 |
| Comp. Ex. 1 | — | DIBP | DCPMS | 18400 | 7100 | 0.43 | 6.3 | 1.1 |
| Comp. Ex. 2 | — | DIBP | DCPMS | 21400 | 8500 | 0.44 | 8.5 | 5.1 |
| Comp. Ex. 3 | — | DHP | DCPMS | 17700 | 8100 | 0.41 | 4.4 | 2.1 |
| Ex. 7 | PBDME*[3] | PBDME | CMMS*[5] | 33600 | 15400 | 0.43 | 6.0 | 0.8 |
| Ex. 8 | PBDME | PBDME | — | 33600 | 15400 | 0.45 | 8.3 | 1.4 |
| Comp. Ex. 4 | — | PBDME | CMMS | 20700 | 10800 | 0.41 | 6.7 | 2.7 |
| Comp. Ex. 5 | — | PBDME | CMMD | 21300 | 8000 | 0.44 | 4.5 | 1.4 |

*[1]DIBP; diisobutyl phthalate
*[2]DHP; diheptyl phthalate mixture
*[3]PBDME; 2-isopropyl 2-isobutyl-1,3-dimethoxypropane
*[4]DCPMS; dicyclopentyldimethoxysilane
*[5]CMMS; cyclohexylmethyldidimethoxysilane Example 9
Preparation of Solid Titanium Catalyst Component (A-13)

(1) 2.88 Grams (30 mmol) of anhydrous magnesium chloride, 15.0 ml of decane and 14.0 ml (90 mmol) of 2-ethylhexyl alcohol were heated at 140° C. for 4 hours to prepare a homogeneous solution. To the solution, 0.667 g (4.5 mmol) of phthalic anhydride was added, and they were mixed and stirred at 130° C. for 1 hour to give a solution.

(2) The homogeneous solution obtained above was cooled to room temperature, and the whole amount of the solution was dropwise added, over a period of 45 minutes, to 80 ml (0.72 mol) of titanium tetrachloride ($TiCl_4$) maintained at −20° C.

(3) The temperature of the resulting liquid mixture was raised to 20 0C., and to the mixture was added 1.04 ml (4.5 mmol) of 2-isopropyl-2-isobutyl-1,3-dimethoxysilane (PBDME), followed by raising the temperature to 110° C. After the temperature reached 110° C., the mixture was stirred at the same temperature for 2 hours.

(4) Then, the solid was recovered by hot filtration, resuspended in 100 ml of $TiCl_4$ and heated to 110° C. Thereafter, 0.240 ml (0.9 mmol) of diisobutyl phthalate (DIBP) was added, and the mixture was heated at 110° C. for 2 hours.

(5) The resulting solid was recovered by hot filtration. The solid was resuspended in 100 ml of $TiCl_4$, and 0.240 ml (0.9 mmol) of DIBP was added to the suspension. Then, the resulting mixture was heated at 110° C. for 30 minutes. These operations were repeated twice.

(6) After the reaction was completed, the solid was recovered by hot filtration again, and the solid was sufficiently washed with decane at 90° C. and with hexane at room temperature until no titanium compound liberated in the washing liquid was detected.

The solid titanium catalyst component (A-13) obtained above was stored as a decane slurry. A part of the decane slurry was dried to analyze composition of the solid titanium catalyst component.

In the solid titanium catalyst component (A-13), 2.9% by weight of titanium, 17% by weight of magnesium, 5.5% by weight of PBDME and 12.6% by weight of DIBP were contained.

Preparation of Prepolymerized Catalyst (13)

Prepolymerization was carried out in the same manner as in Example 1, except that the solid titanium catalyst component (A-13) was used in place of the solid titanium catalyst component (A-1), to prepare a prepolymerized catalyst (13).

Polymerization

Polymerization was carried out in the same manner as in Example 1, except that the prepolymerized catalyst (13) was used in place of the prepolymerized catalyst (1) and the amount of hydrogen was varied to 100 ml. The results are set forth in Table 2.

Example 10
Preparation of Solid Titanium Catalyst Component (A-14)

The operations (1) and (2) of Example 9 were carried out.

(3) The temperature of the above-obtained liquid mixture containing magnesium chloride and $TiCl_4$ was raised to 20° C., and to the mixture was added 0.518 ml (2.25 mmol) of PBDME, followed by raising the temperature to 110° C. After the temperature reached 110° C., the mixture was stirred at the same temperature for 2 hours.

(4) Then, the solid was recovered by hot filtration, resuspended in 100 ml of $TiCl_4$ and heated to 110° C. Thereafter, 0.801 ml (3 mmol) of DIBP was added, and the mixture was heated at 110° C. for 1 hour.

(5) The solid was recovered by hot filtration and suspended in 100 ml of $TiCl_4$. Then, 0.518 ml (2.25 mmol) of PBDME was added, and the mixture was heated at 110° C. for 30 minutes.

(6) The solid was recovered by hot filtration, suspended in 100 ml of $TiCl_4$ and heated at 110° C. for 30 minutes.

Then, the washing operation (6) of Example 9 was carried out.

The solid titanium catalyst component (A-14) obtained above was stored as a decane slurry. A part of the decane slurry was dried to analyze composition of the solid titanium catalyst component.

TABLE 2

|  | (d-i) | (d-ii) | c | Polymerization activity (g-pp/ mmol-Ti) | (g-pp/ g-cat.) | BD g/ml | MFR g/10 min | t-DS wt % |
|---|---|---|---|---|---|---|---|---|
| Ex. 9 | PBDME | DIBP | DCPMS | 22800 | 10200 | 0.42 | 3.8 | 1.6 |
| Ex. 10 | PBDME | DIBP, PBDME | DCPMS | 17800 | 11000 | 0.44 | 7.2 | 1.2 |
| Ex. 11 | DIBP | PBDME | DCPMS | 32600 | 9100 | 0.42 | 7.9 | 1.2 |

In the solid titanium catalyst component (A-14), 4.0% by weight of titanium, 15% by weight of magnesium, 6.5% by weight of PBDME and 16.4% by weight of DIBP were contained.

Preparation of Prepolymerized Catalyst (14)

Prepolymerization was carried out in the same manner as in Example 1, except that the solid titanium catalyst component (A-14) was used in place of the solid titanium catalyst component (A-1), to prepare a prepolymerized catalyst (14).

Polymerization

Polymerization was carried out in the same manner as in Example 9, except that the prepolymerized catalyst (14) was used in place of the prepolymerized catalyst (13). The results are set forth in Table 2.

Example 11

Preparation of Solid Titanium Catalyst Component (A-15)

The operations (1) and (2) of Example 9 were carried out.

(3) The temperature of the above-obtained liquid mixture containing magnesium chloride and $TiCl_4$ was raised to 20° C., and to the mixture was added 0.801 ml (3 mmol) of DIBP, followed by raising the temperature to 110° C. After the temperature reached 110° C., the mixture was stirred at the same temperature for 2 hours.

(4) Then, the solid was recovered by hot filtration, resuspended in 100 ml of $TiCl_4$ and heated to 110° C. Thereafter, 0.345 ml (1.5 mmol) of PBDME was added, and the mixture was heated at 110° C. for 1 hour.

(5) The resulting solid was recovered by hot filtration. The solid was resuspended in 100 ml of $TiCl_4$, and 0.345 ml (1.5 mmol) of PMDME was added. The resulting mixture was heated again at 110° C. for 30 minutes. These operations were repeated twice.

Then, the washing operation (6) of Example 9 was carried out.

The solid titanium catalyst component (A-15) obtained above was stored as a decane slurry. A part of the decane slurry was dried to analyze composition of the solid titanium catalyst component.

In the solid titanium catalyst component (A-15), 1.4% by weight of titanium, 22% by weight of magnesium, 8.9% by weight of PBDME and 1.2% by weight of DIBP were contained.

Preparation of Prepolymerized Catalyst (15)

Prepolymerization was carried out in the same manner as in Example 1, except that the solid titanium catalyst component (A-15) was used in place of the solid titanium catalyst component (A-1), to prepare a prepolymerized catalyst (15).

Polymerization

Polymerization was carried out in the same manner as in Example 9, except that the prepolymerized catalyst (15) was used in place of the prepolymerized catalyst (13). The results are set forth in Table 2.

Example 12

Polymerization

Polymerization was carried out in the same manner as in Example 7, except that the amount of hydrogen was varied to 500 ml when the prepolymerized catalyst was prepared. The results are set forth in Table 3.

Example 13

Polymerization

Polymerization was carried out in the same manner as in Example 12, except that the amount of TEA was varied to 0.4 mmol in the preparation of prepolymerized catalyst. The results are set forth in Table 3.

Example 14

Polymerization

Polymerization was carried out in the same manner as in Example 13, except that the propylene gas was fed to the reactor at a feed rate of 0.46 l/hr to perform polymerization at 20° C. for 3 hours with stirring in the preparation of the prepolymerized catalyst. The results are set forth in Table 3.

TABLE 3

|  | Polymerization activity (g-pp/mmol-Ti) | (g-pp/g-cat.) | BD g/ml | MFR g/10 min | t-DS wt % |
|---|---|---|---|---|---|
| Ex. 12 | 36200 | 16600 | 0.40 | 170 | 1.2 |
| Ex. 13 | 40700 | 18600 | 0.44 | 100 | 1.2 |
| Ex. 14 | 38300 | 17600 | 0.44 | 180 | 1.3 |

What is claimed is:

1. A process for preparing a solid titanium catalyst component, comprising the steps of:

(I) contacting a liquid magnesium compound with a liquid titanium compound to precipitate a solid in the contact liquid (β), and adding an electron donor (d-i), which is selected from the group consisting of a polycarboxylic ester and a compound having two or more ether linkages present through plural atoms, to the contact liquid (β) during the time between the beginning and the end of the solid precipitation, to form a solid product (α) comprising titanium, magnesium and the electron donor (d-i); and then (II) contacting the solid product (α) obtained after completion of the solid precipitation with an electron donor (d-ii) selected from the group consisting of a polycarboxylic ester and a compound having two or more ether linkages present through plural atoms, to prepare a solid titanium catalyst component comprising titanium, magnesium, the electron donor (d-i) and the electron donor (d-ii).

2. The process for preparing a solid titanium catalyst component as claimed in claim 1, wherein the contact liquid (β) contains, before addition of the electron donor (d-i) thereto, an electron donor (d-iii) selected from the group consisting of a monocarboxylic ester, an aliphatic carboxylic acid, an acid anhydride, a ketone, a monoether, an aliphatic carbonate, an alkoxy group-containing alcohol, an aryloxy group-containing alcohol, an organosilicon compound having Si—O—C bond and an organophosphorus compound having P—O—C bond.

3. The process for preparing a solid titanium catalyst component as claimed in claim 1, wherein the polycarboxylic ester is a phthalic diester represented by the following formula:

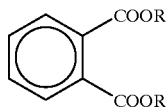

wherein R is a branched hydrocarbon group of 3 to 12 carbon atoms, and two of R may be the same or different.

4. The process for preparing a solid titanium catalyst component as claimed in claim 1, wherein the electron donor (d-i) used in the step (I) is diheptyl phthalate and the electron donor (d-ii) used in the step (II) is diisobutyl phthalate.

5. The process for preparing a solid titanium catalyst component as claimed in claim 1, wherein the compound having two or more ether linkages present through plural atoms is represented by the following formula:

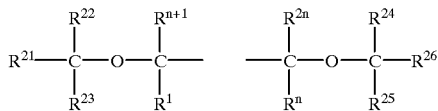

wherein n is an integer of $2 \leq n \leq 10$, $R^1$ to $R^{26}$ are each a substituent having at least one element selected from carbon, hydrogen, oxygen, halogen, nitrogen, sulfur, phosphorus, boron and silicon; groups optionally selected from $R^1$ to $R^{26}$, may form together a ring other than a benzene ring; and the main chain may contain an atom other than carbon.

6. The process for preparing a solid titanium catalyst component as claimed in claim 1, wherein the molar ratio of the electron donor (d-i) used in the step (I) to the electron donor (d-ii) used in the step (II) is in the range of 10/90 to 90/10.

7. An olefin polymerization catalyst comprising:
(A) a solid titanium catalyst component prepared by the process as claimed in claim 1,
(B) an organoaluminum compound, and optionally
(C) an electron donor.

8. The process of claim 1, wherein the magnesium compound has reduction ability and is represented by the formula:

$$MgX^1{}_nR^1{}_{2-n}$$

wherein n is a number of $0 \leq n < 2$, $R^1$ is hydrogen, an alkyl group of 1 to 20 carbon atoms, an aryl group or a cycloalkyl group, when n is 0, two of $R^1$ may be the same as or different from each other, and $X^1$ is halogen, hydrogen or an alkoxy group.

9. The process of claim 1, wherein the magnesium compound has no reduction ability.

10. The process of claim 9, wherein the magnesium compound is selected from the group consisting of magnesium chloride, alkoxymagnesium chloride and aryloxymagnesium chloride.

11. The process of claim 1, wherein the liquid titanium compound is a tetravalent titanium compound.

12. The process of claim 11, wherein the tetravalent titanium compound is represented by the following formula:

wherein R is a hydrocarbon group, X is a halogen atom, and $0 \leq g \leq 4$.

13. The process of claim 1, wherein the polycarboxylic ester is represented by the following formulas:

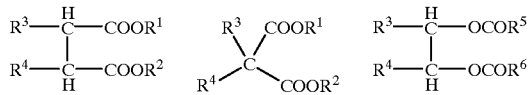

wherein $R^1$ is a substituted or unsubstituted hydrocarbon group, $R^2$, $R^5$ and $R^6$ are each hydrogen or a substituted or unsubstituted hydrocarbon group, $R^3$ and $R^4$ are each hydrogen or a substituted or unsubstituted hydrocarbon group, and at least one of $R^3$ and $R^4$ is preferably a substituted or unsubstituted hydrocarbon group, wherein $R^3$ and $R^4$ may be linked to each other to form a cyclic structure, and when the hydrocarbon groups $R^1$ to $R^6$ are substituted, the substituents contain hetero atoms.

14. The process of claim 2, wherein the liquid magnesium compound is contacted with the liquid titanium compound in the presence of the electron donor (d-iii) and at a temperature of −70 to 200° C. in order to precipitate a solid.

15. The process of claim 2, wherein the liquid magnesium compound is contacted with the liquid titanium compound in the presence of the electron donor (d-iii) at a low temperature, followed by slowly elevating the temperature in order to precipitate a solid, wherein the electron donor (d-i) is added while the temperature is slowly raising and when a solid is precipitated in the contact liquid (β) in an amount not less than 20% by weight and less than 100% by weight based on 100% by weight of the solid that is finally precipitated.

16. The process of claim 1, wherein the titanium compound is present in an amount of 0.01 to 1000 mol based on 1 mol of the magnesium compound.

17. The process of claim 2, wherein the electron donor (d-iii) is present in an amount of 0.1 to 1 mol based on 1 mol of the magnesium compound.

18. The process of claim 1, wherein the electron donor (d-i) is present in an amount 0.005 to 9.995 mol based on 1 mol of the magnesium compound.

19. A process for preparing a solid titanium catalyst component, comprising the steps of:
(I) contacting a liquid magnesium compound with a liquid titanium compound to precipitate a solid in the contact liquid (β), wherein one or both of said liquid magnesium and titanium compounds are halogenated compounds,
and adding an electron donor (d-i), which is selected from the group consisting of a polycarboxylic ester and a compound having two or more ether linkages present through plural atoms, to the contact liquid (β) during the time between the beginning and the end of the solid precipitation, to form a solid product (α) comprising titanium, magnesium, halogen and the electron donor (d-i); and then (II) contacting the solid product (α) obtained after completion of the solid precipitation with an electron donor (d-ii) selected from the group consisting of a polycarboxylic ester and a compound having two or more ether linkages present through plural atoms, to prepare a solid titanium catalyst component comprising titanium, magnesium, halogen, the electron donor (d-i) and the electron donor (d-ii).

20. The process for preparing a solid titanium catalyst component as claimed in claim 19, wherein the contact liquid (β) contains, before addition of the electron donor (d-i) thereto, an election donor (d-iii) selected from the group consisting of a monocarboxylic ester, an aliphatic carboxylic acid, an acid anhydride, a ketone, a monoether, an aliphatic carbonate, an alkoxy group-containing alcohol, an aryloxy group-containing alcohol, an organosilicon compound having Si—O—C bond and an organophosphorus compound having P—O—C bond.

21. The process for preparing a solid titanium catalyst component as claimed in claim 19, wherein the polycarboxylic ester is a phthalic diester represented by the following formula:

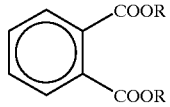

wherein R is a branched hydrocarbon group of 3 to 12 carbon atoms, and two of R may be the same or different.

22. The process for preparing a solid titanium catalyst component as claimed in claim 19, wherein the electron donor (d-i) used in the step (I) is dihepthyl phthalate and the electron donor (d-ii) used in the step (II) is diisobutyl phthalate.

23. The process for preparing a solid titanium catalyst component as claimed in claim 19, wherein the compound having two or more ether linkages present through plural atoms is represented by the following formula:

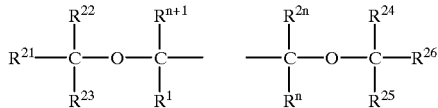

wherein n is an integer of $2 \leq n \leq 10$, $R^1$ to $R^{26}$ are each a substituent having at least one element selected from carbon, hydrogen, oxygen, halogen, nitrogen, sulfur, phosphorus, boron and silicon; groups optionally selected from $R^1$ to $R^{26}$, may form together a ring other than a benzene ring; and the main chain may contain an atom other than carbon.

24. The process for preparing a solid titanium catalyst component as claimed in claim 19, wherein the molar ratio of the electron donor (d-i) used in the step (I) to the electron donor (d-ii) used in the step (II) is in the range of 10/90 to 90/10.

25. An olefin polymerization catalyst comprising:
(A) a solid titanium catalyst component prepared by the process as claimed in claim 19,
(B) an organoaluminum compound, and optionally
(C) an electron donor.

26. The process of claim 19, wherein the magnesium compound has reduction ability and is represented by the formula:

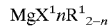

wherein n is a number of $0 \leq n < 2$, $R^1$ is hydrogen, an alkyl group of 1 to 20 carbon atoms, an aryl group or a cycloalkyl group, when n is 0, two of $R^1$ may be the same as or different from each other, and $X^1$ is halogen, hydrogen or an alkoxy group.

27. The process of claim 19, wherein the magnesium compound has no reduction ability.

28. The process of claim 20, wherein the magnesium compound is selected from the group consisting of magnesium chloride, alkoxymagnesium chloride and aryloxymagnesium chloride.

29. The process of claim 19, wherein the liquid titanium compound is a tetravalent titanium compound.

30. The process of claim 29, wherein the tetravalent titanium compound is represented by the following formula:

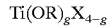

wherein R is a hydrocarbon group, X is a halogen atom, and $0 \leq g \leq 4$.

31. The process of claim 19, wherein the polycarboxylic ester is represented by the following formulas:

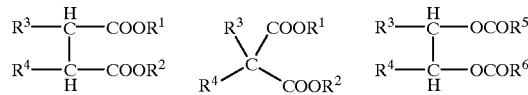

wherein $R^1$ is a substituted or unsubstituted hydrocarbon group, $R^2$, $R^5$ and $R^6$ are each hydrogen or a substituted or unsubstituted hydrocarbon group, $R^3$ and $R^4$ are each hydrogen or a substituted or unsubstituted hydrocarbon group, and at least one of $R^3$ and $R^4$ is preferably a substituted or unsubstituted hydrocarbon group, wherein $R^3$ and $R^4$ may be linked to each other to form a cyclic structure, and when the hydrocarbon groups $R^1$ to $R^6$ are substituted, the substituents contain hetero atoms.

32. The process of claim 20, wherein the liquid magnesium compound is contacted with the liquid titanium compound in the presence of the electron donor (d-iii) and at a temperature of −70 to 200° C. in order to precipitate a solid.

33. The process of claim 20, wherein the liquid magnesium compound is contacted with the liquid titanium compound in the presence of the electron donor (d-iii) at a low temperature, followed by slowly elevating the temperature in order to precipitate a solid, wherein the electron donor (d-i) is added while the temperature is slowly raising and when a solid is precipitated in the contact liquid (β) in an amount not less than 20% by weight and less than 100% by weight based on 100% by weight of the solid that is finally precipitated.

34. The process of claim 19, wherein the titanium compound is present in an amount of 0.01 to 1000 mol based on 1 mol of the magnesium compound.

35. The process of claim 20, wherein the electron donor (d-iii) is present in an amount of 0.1 to 1 mol based on 1 mol of the magnesium compound.

36. The process of claim 19, wherein the electron donor (d-i) is present in an amount 0.005 to 9.995 mol based on 1 mol of the magnesium compound.

* * * * *